United States Patent
Farag et al.

(10) Patent No.: US 12,328,271 B2
(45) Date of Patent: Jun. 10, 2025

(54) METHOD AND APPARATUS FOR INDICATION OF INTER-CELL BEAM MANAGEMENT

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US); Dalin Zhu, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 17/650,062

(22) Filed: Feb. 4, 2022

(65) Prior Publication Data

US 2022/0263616 A1 Aug. 18, 2022

Related U.S. Application Data

(60) Provisional application No. 63/297,099, filed on Jan. 6, 2022, provisional application No. 63/249,420, filed on Sep. 28, 2021, provisional application No. 63/232,048, filed on Aug. 11, 2021, provisional application No. 63/181,047, filed on Apr. 28, 2021, (Continued)

(51) Int. Cl.
*H04L 5/00* (2006.01)

(52) U.S. Cl.
CPC .......... *H04L 5/0032* (2013.01); *H04L 5/0051* (2013.01)

(58) Field of Classification Search
CPC ............................ H04L 5/0051; H04L 5/0032
See application file for complete search history.

(56) References Cited

U.S. PATENT DOCUMENTS

2020/0296704 A1* 9/2020 Vilaipornsawai ..... H04L 5/0094
2021/0352654 A1* 11/2021 Ai ..................... H04W 72/0453
(Continued)

FOREIGN PATENT DOCUMENTS

| WO | 2020155160 A1 | 8/2020 |
| WO | 2020164133 A1 | 8/2020 |

OTHER PUBLICATIONS

"3rd Generation Partnership Project; Technical Specification Group Radio Access Network; NR; Physical channels and modulation (Release 16)", 3GPP TS 38.211 V16.8.0, Dec. 2021, 134 pages.
(Continued)

*Primary Examiner* — Kevin M Cunningham

(57) ABSTRACT

Apparatuses and methods for indication for inter-cell beam management in a wireless communication system. A method of operating a user equipment (UE) includes receiving configuration information for a list of transmission configuration indication (TCI) states, receiving TCI state code points activated by a medium access control-control element (MAC CE), and receiving DL control information (DCI) indicating at least one of the activated TCI state code points. The method further includes determining a TCI state to apply to at least one of downlink (DL) channels and uplink (UL) channels within at least one entity; updating one or more spatial filters for at least one of the DL channels and the UL channels based on the determined TCI state; and receiving and transmitting the DL channels and the UL channels of the at least one entity, respectively, based on the updated one or more spatial filters.

15 Claims, 22 Drawing Sheets

Related U.S. Application Data provisional application No. 63/152,766, filed on Feb. 23, 2021, provisional application No. 63/149,950, filed on Feb. 16, 2021.

(56) References Cited

U.S. PATENT DOCUMENTS

| | | |
|---|---|---|
| 2021/0385803 A1 | 12/2021 | Shi et al. |
| 2022/0210800 A1* | 6/2022 | Babaei .............. H04L 5/0092 |
| 2022/0225385 A1* | 7/2022 | Pezeshki ............ H04B 7/063 |
| 2022/0345272 A1* | 10/2022 | Guo ................... H04L 5/0044 |

OTHER PUBLICATIONS

"3rd Generation Partnership Project; Technical Specification Group Radio Access Network; NR; Multiplexing and channel coding (Release 16)", 3GPP TS 38.212 V16.8.0, Dec. 2021, 153 pages.
"3rd Generation Partnership Project; Technical Specification Group Radio Access Network; NR; Physical layer procedures for control (Release 16)", 3GPP TS 38.213 V16.8.0, Dec. 2021, 189 pages.
"3rd Generation Partnership Project; Technical Specification Group Radio Access Network; NR; Physical layer procedures for data (Release 16)", 3GPP TS 38.214 V16.8.0, Dec. 2021, 172 pages.
"5G; NR; Medium Access Control (MAC) protocol specification (3GPP TS 38.321 version 16.7.0 Release 16)", ETSI TS 138 321 V16.7.0, Jan. 2022, 160 pages.
"5G; NR; Radio Resource Control (RRC); Protocol specification (3GPP TS 38.331 version 16.7.0 Release 16)", ETSI TS 138 331 V16.7.0, Jan. 2022, 950 pages.
International Search Report and Written Opinion issued May 19, 2022 regarding Application No. PCT/KR2022/002267, 8 pages.
Samsung, "Multi-beam enhancements", 3GPP TSG RAN WG1 #103-e, R1-2008148, Oct. 2020, 20 pages.
Ericsson, "Enhancements on Multi-beam Operation", 3GPP TSG-RAN WG1 Meeting #104-e, R1-2101313, Jan. 2021, 22 pages.
Samsung, "Multi-beam enhancements", 3GPP TSG RAN WG1 #104-e, R1-2101186, Jan. 2021, 22 pages.
Sharp, "Other enhancements for beam management", 3GPP TSG RAN WG1 #103-e, R1-2009132, Oct. 2020, 2 pages.
Extended European Search Report issued Oct. 4, 2024 regarding Application No. 22756479.6, 12 pages.
Nokia et al., "Enhancements on Multi-beam Operation", 3GPP TSG RAN WG1 #104-e, R1-2101005, Jan. 2021, 26 pages.
Vivo, "Further discussion on multi beam enhancement", 3GPP TSG RAN WG1 #104-e, R1-2100421, Jan. 2021, 29 pages.

* cited by examiner

FIG. 18

| TCI state ID in channel conveying beam indication | 0 | 1 | ... | M1-1 | M1 | M1+1 | ... | M1+M2 ... + MK - 1 |
|---|---|---|---|---|---|---|---|---|
| TCI state ID configured for each entity | $TCI_{0\_0}$ | $TCI_{0\_1}$ | | $TCI_{0\_M1-1}$ | $TCI_{1\_0}$ | $TCI_{1\_1}$ | | $TCI_{K-1\_MK-1}$ |

$TCI_{k\_m}$ is TCI State ID m for entity k
Mk: Number of TCI state IDs for entity k

| ID of entity (k) | ID of TCI state within entity (m) |
|---|---|

TCI state ID for $TCI_{k\_m}$.
k is the ID of entity
m is the ID of TCI state within entity k

*1900*

MAC CE to activate TCI state IDs association with entity ID k

MAC CE Message to activate TCI state IDs associated with different entities

| Entity k1 | Number of TCIs M1 | TCI$_{k1\_a1}$ | TCI$_{k1\_b1}$ | --- | TCI$_{k1\_c1}$ | Entity k2 | Number of TCIs M2 | TCI$_{k2\_a2}$ | TCI$_{k2\_b2}$ | --- | TCI$_{k2\_c2}$ | --- |

MAC CE to activate TCI state IDs associated with different entities. Each entity ID followed optionally by number of activated TCI state for that entity and the activated TCI state IDs.

| Entity k1 | Entity k2 | --- | Number of TCIs M1 | TCI$_{k1\_a1}$ | TCI$_{k1\_b1}$ | --- | TCI$_{k1\_c1}$ | Number of TCIs M2 | TCI$_{k2\_a2}$ | TCI$_{k2\_b2}$ | --- | TCI$_{k2\_c2}$ | --- |

MAC CE to activate TCI state IDs associated with different entities. List of entity IDs followed optionally by number of activated TCI state IDs for each entity followed by the activated TCI state IDs for each entity.

| Entity k1 | Bitmap of activated TCI states for entity k1 | Entity k2 | Bitmap of activated TCI states for entity k2 | --- |

MAC CE to activate TCI state IDs associated with different entities. Each entity ID followed by bitmap of activated TCI states for that entity.

| Entity k1 | Entity k2 | --- | Bitmap of activated TCI states for entity k1 | Bitmap of activated TCI states for entity k2 | --- |

MAC CE to activate TCI state IDs associated with different entities. List of entities followed by bitmaps of activated TCI states for these entities.

FIG. 22

| TCI state ID in channel conveying beam indication | 0 | 1 | ... | M1-1 | M1 | M1+1 | ... | M1+M2 ... + MK - 1 |
|---|---|---|---|---|---|---|---|---|
| Activated TCI state ID for each activated entity | $TCI_{0\_0}$ | $TCI_{0\_1}$ | | $TCI_{0\_M1-1}$ | $TCI_{1\_0}$ | $TCI_{1\_1}$ | | $TCI_{K-1\_MK-1}$ |

$TCI_{k\_m}$ is activated TCI State ID m for activated entity k
Mk: Number of activated TCI state IDs for entity k

FIG. 23

| ID of entity (k) | ID of TCI state within entity (m) |
|---|---|

TCI state ID for $TCI_{k\_m}$,
k is the ID of entity
m is the ID of TCI state within entity k

| Type 1 RS ID in TCI State | M1-1 | M1 | M1+1 | ... | M1+M2 ... + MK - 1 |
|---|---|---|---|---|---|
| RS ID configured for each entity | $RS_{0\_M1-1}$ | $RS_{1\_0}$ | $RS_{1\_1}$ | | $RS_{K-1\_MK-1}$ |

| | 0 | 1 |
|---|---|---|
| | $RS_{0\_0}$ | $RS_{0\_1}$ |

$RS_{k\_m}$ is RS ID m for entity k
Mk: Number of RS IDs for entity k

FIG. 26

| Entity Index | 0 | 1 | ... | M-1 |
|---|---|---|---|---|
| Entity | $Entity_0$ | $Entity_1$ | | $Entity_{M-1}$ |

Message configuring M entities

FIG. 27

| Entity Index or ID | RS ID within entity |
|---|---|

Type 1 RS ID in TCI State

Type 2 RS Confuration

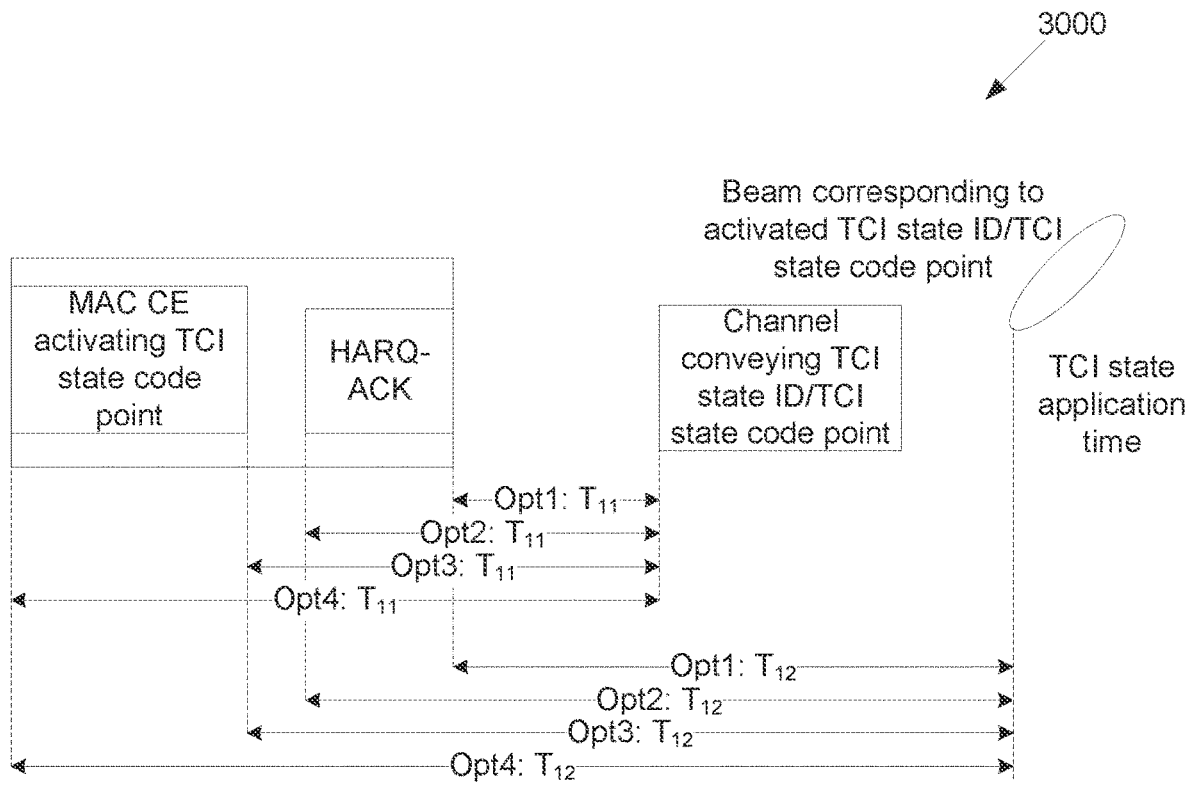
Case 1: Activated TCI state ID in new entity
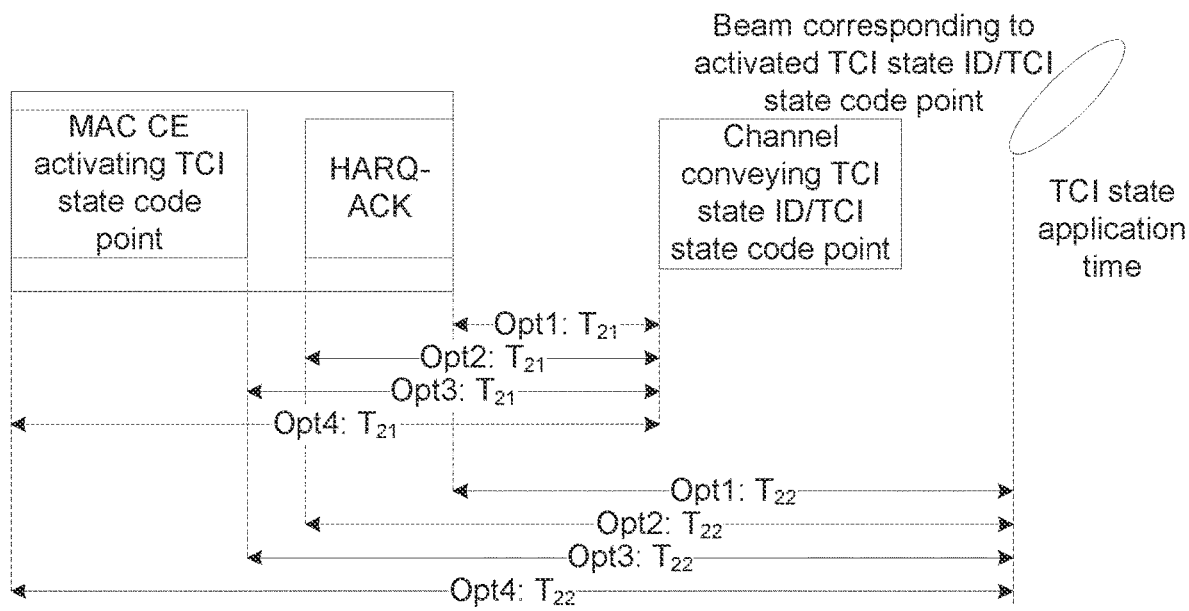
Case 2: Activated TCI state ID in existing entity
FIG. 30

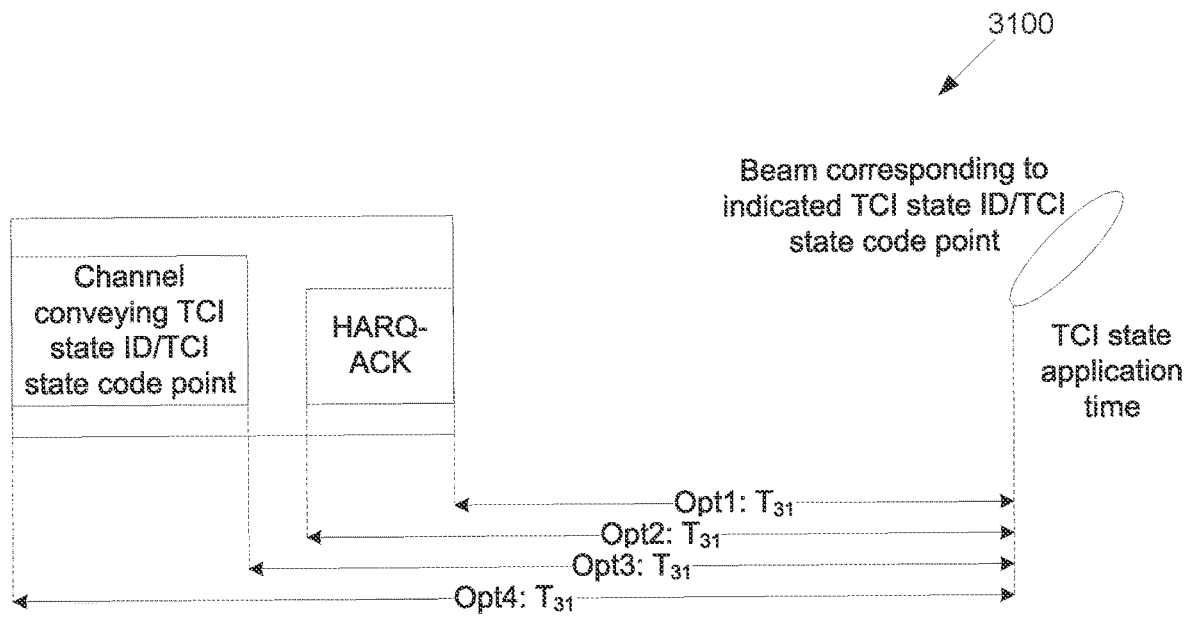
Case 1: Indicated TCI state ID in same entity as current TCI state
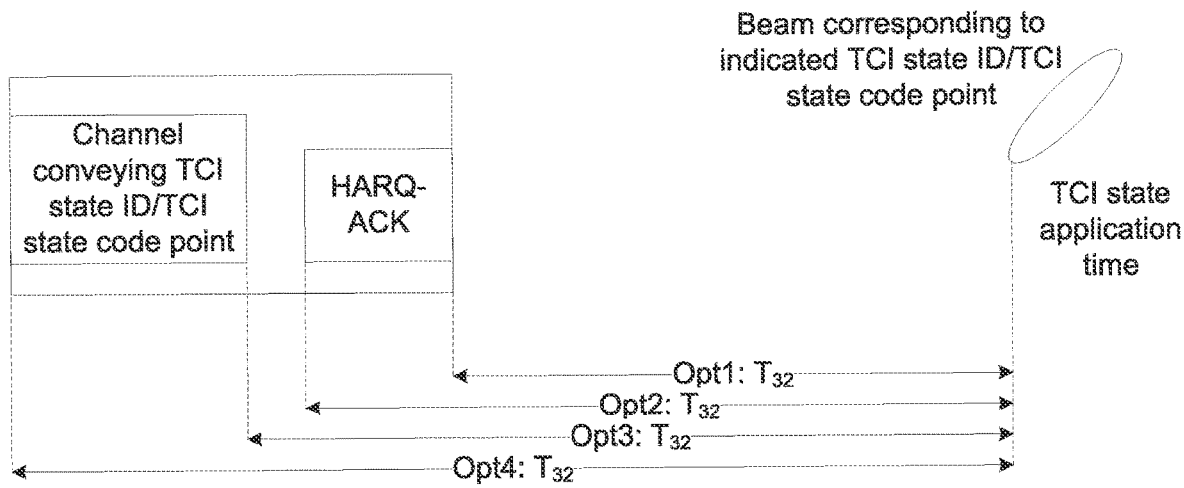
Case 2: Indicated TCI state ID in new entity different from current TCI state
FIG. 31

METHOD AND APPARATUS FOR INDICATION OF INTER-CELL BEAM MANAGEMENT

CROSS-REFERENCE TO RELATED APPLICATIONS AND CLAIM OF PRIORITY

The present application claims priority to:
U.S. Provisional Patent Application No. 63/149,950, filed on Feb. 16, 2021;
U.S. Provisional Patent Application No. 63/152,766, filed on Feb. 23, 2021;
U.S. Provisional Patent Application No. 63/181,047, filed on Apr. 28, 2021;
U.S. Provisional Patent Application No. 63/232,048, filed on Aug. 11, 2021;
U.S. Provisional Patent Application No. 63/249,420, filed on Sep. 28, 2021; and
U.S. Provisional Patent Application No. 63/297,099, filed on Jan. 6, 2022.
The content of the above-identified patent document is incorporated herein by reference.

TECHNICAL FIELD

The present disclosure relates generally to wireless communication systems and, more specifically, the present disclosure relates to an indication for inter-cell beam management in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to an indication for inter-cell beam management in a wireless communication system.

In one embodiment, a user equipment (UE) is provided. The UE includes a transceiver configured to receive configuration information for a list of transmission configuration indication (TCI) states associated with more than one entity, receive TCI state code points activated by a medium access control-control element (MAC CE), and receive DL control information (DCI) indicating at least one of the activated TCI state code points. A TCI state code point includes one of: one or more downlink (DL) TCI states, one or more uplink (UL) TCI states, or a combination of one or more DL TCI states and one or more UL TCI states. The UE further includes a processor operably coupled to the transceiver. The processor is configured to determine a TCI state to apply to at least one of DL channels and UL channels within at least one entity and update one or more spatial filters for at least one of the DL channels and the UL channels based on the determined TCI state. The transceiver is further configured to at least one of receive and transmit the DL channels and the UL channels of the at least one entity, respectively, based on the updated one or more spatial filters.

In another embodiment, a base station (BS) is provided. The BS includes a transceiver configured to transmit configuration information for a list of TCI states associated with more than one entity and a processor operably coupled to the transceiver. The processor is configured to determine TCI states to activate or indicate for at least one of DL channels and UL channels of at least one entity. The transceiver is further configured to transmit activated TCI state code points via a MAC CE and transmit DCI indicating at least one of the activated TCI state code points. A TCI state code point includes one of one or more DL TCI states, one or more UL TCI states, or a combination of one or more DL TCI states and one or more UL TCI states. The processor is further configured to determine a TCI state to apply to at least one of DL channels and UL channels within the at least one entity and update one or more spatial filters for at least one of the DL channels and the UL channels based on the determined TCI state. The transceiver is further configured to at least one of transmit and receive the DL channels and the UL channels of the at least one entity, respectively, based on the updated one or more spatial filters.

In yet another embodiment, a method of operating a UE is provided. The method includes receiving configuration information for a list of TCI states associated with more than one entity, receiving TCI state code points activated by a MAC CE, and receiving a DCI indicating at least one of the activated TCI state code points. A TCI state code point includes one of one or more DL TCI states, one or more UL TCI states, or a combination of one or more DL TCI states and one or more UL TCI states. The method further includes determining a TCI state to apply to at least one of DL channels and UL channels within at least one entity; updating one or more spatial filters for at least one of the DL channels and the UL channels based on the determined TCI state; and receiving and transmitting the DL channels and the UL channels of the at least one entity, respectively, based on the updated one or more spatial filters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18 illustrates an example of TCI state according to embodiments of the present disclosure;

FIG. 19 illustrates an example of TCI state with two parts according to embodiments of the present disclosure;

FIG. 22 illustrates an example of TCI state ID according to embodiments of the present disclosure;

FIG. 23 illustrates another example of TCI state ID according to embodiments of the present disclosure;

FIG. 24 illustrates an example of TCI state ID with two fields according to embodiments of the present disclosure;

FIG. 25 illustrates an example of Reference Signal ID according to embodiments of the present disclosure;

FIG. 26 illustrates another example of entity ID according to embodiments of the present disclosure;

FIG. 27 illustrates yet another example of Reference Signal ID according to embodiments of the present disclosure;

FIG. 30 illustrates an example of activated TCI state ID/TCI state code point according to embodiments of the present disclosure; and FIG. 31 illustrates an example of an indicated TCI state ID/TCI state code point according to embodiments of the present disclosure.

DETAILED DESCRIPTION

FIG. 1 through FIG. 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.8.0, "NR; Physical channels and modulation"; 3GPP TS 38.212 v16.8.0, "NR; Multiplexing and Channel coding"; 3GPP TS 38.213 v16.8.0, "NR; Physical Layer Procedures for Control"; 3GPP TS 38.214 v16.8.0, "NR; Physical Layer Procedures for Data"; 3GPP TS 38.321 v16.7.0, "NR; Medium Access Control (MAC) protocol specification"; and 3GPP TS 38.331 v16.7.0, "NR; Radio Resource Control (RRC) Protocol Specification."

Figure 1:
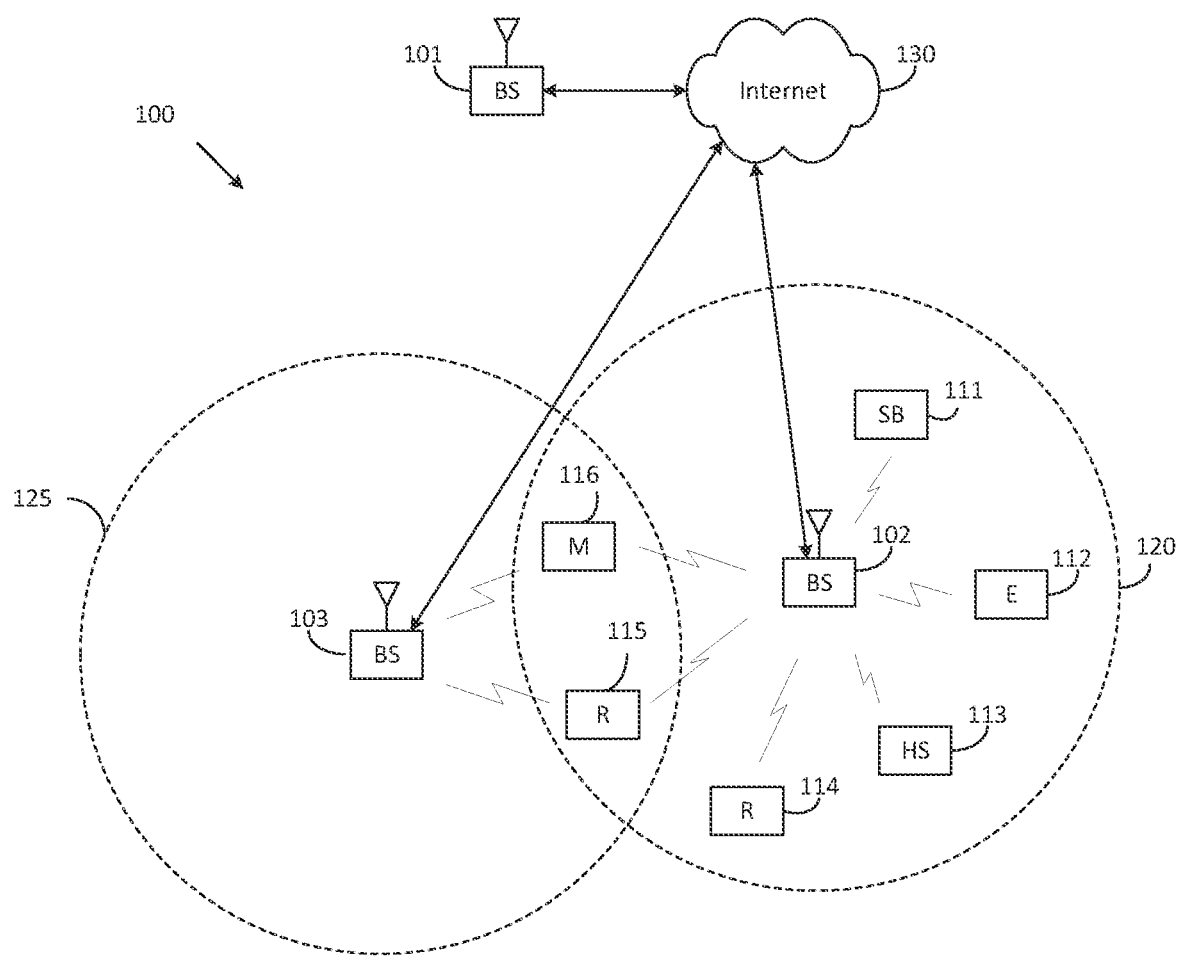
FIG. 1 illustrates an example of wireless network according to embodiments of the present disclosure.
Figure 2:
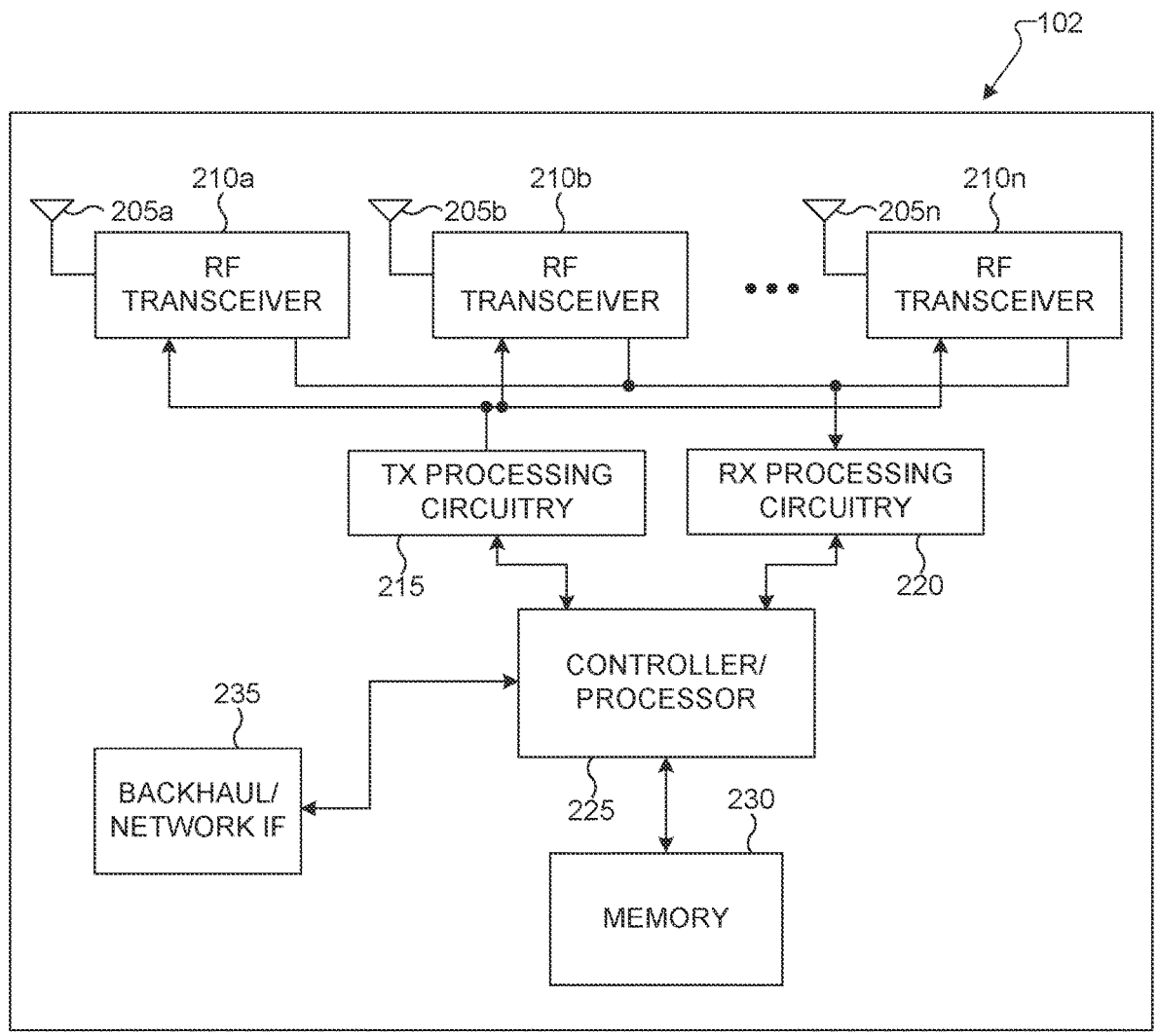
FIG. 2 illustrates an example of a gNB according to embodiments of the present disclosure.
Figure 3:
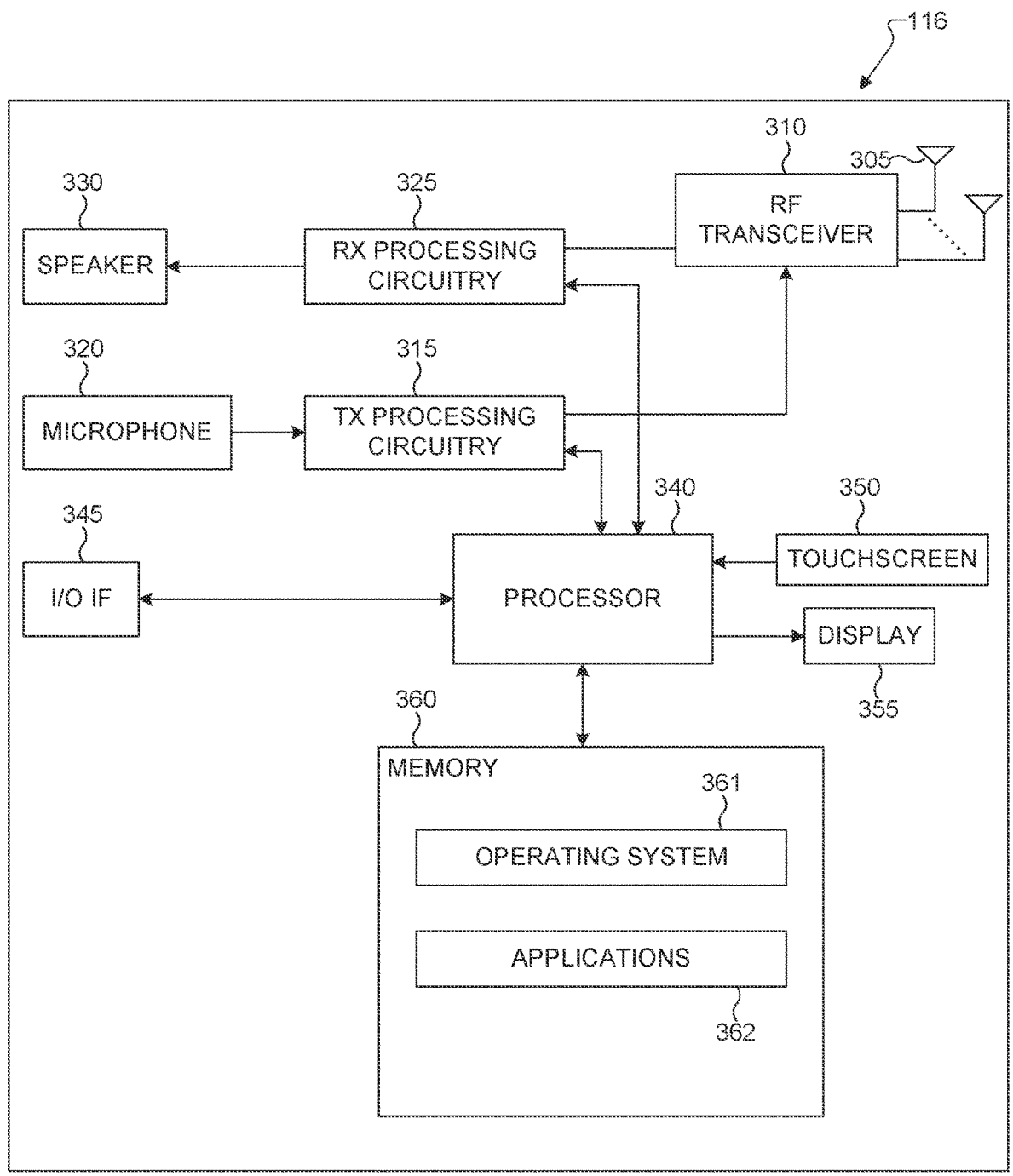
FIG. 3 illustrates an example of a UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for an indication for inter-cell beam management in a wireless communication system. In certain embodiments, and one or more of the gNBs 101-103 includes circuitry, programming, or a combination thereof, for an indication for inter-cell beam management in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (DL) channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support an indication for inter-cell beam management in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an indication for inter-cell beam management in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
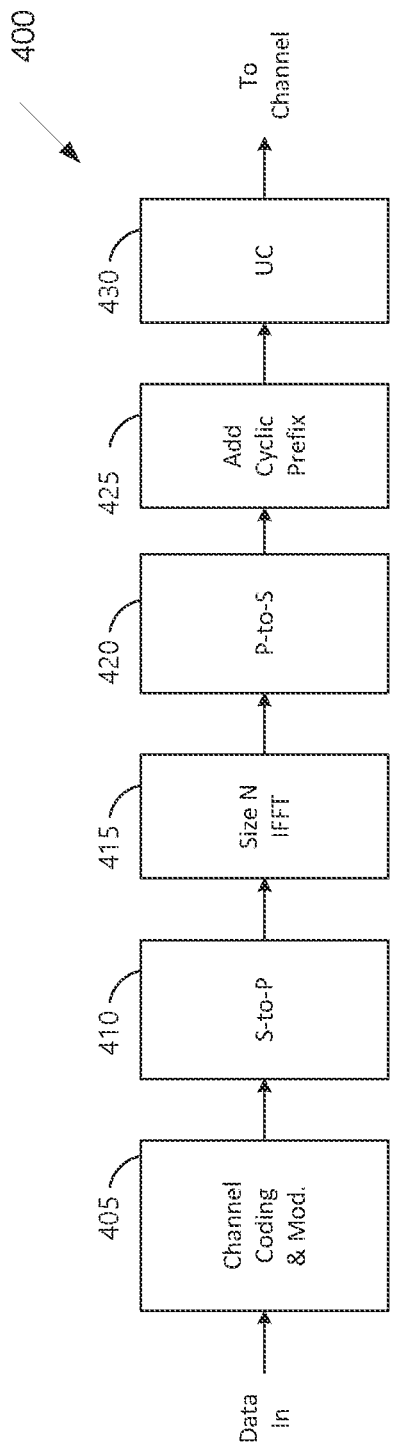
FIGS. 4 and 5 illustrate example of wireless transmit and receive paths according to this disclosure.
Figure 5:
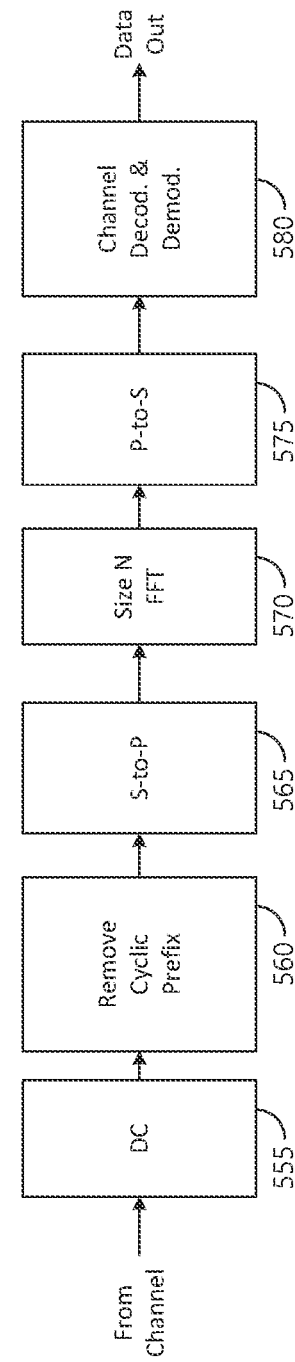

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network. In the present disclosure, a beam is determined by either of: (1) a TCI state, that establishes a quasi-colocation (QCL) relationship between a source reference signal (e.g., SSB and/or CSI-RS) and a target reference signal; and/or (2) a spatial relation information that establishes an association to a source reference signal, such as SSB or CSI-RS or SRS. In either case, the ID of the source reference signal identifies the beam.

Rel-17 introduced the unified TCI framework, where a unified or master or main TCI state is signaled to the UE. The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state can be used at least for UE-dedicated DL channels; and/or (3) in case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

The TCI state and/or the spatial relation reference RS can determine a spatial Rx filter for reception of downlink channels at the UE, or a spatial Tx filter for transmission of uplink channels from the UE.

Figure 6A:
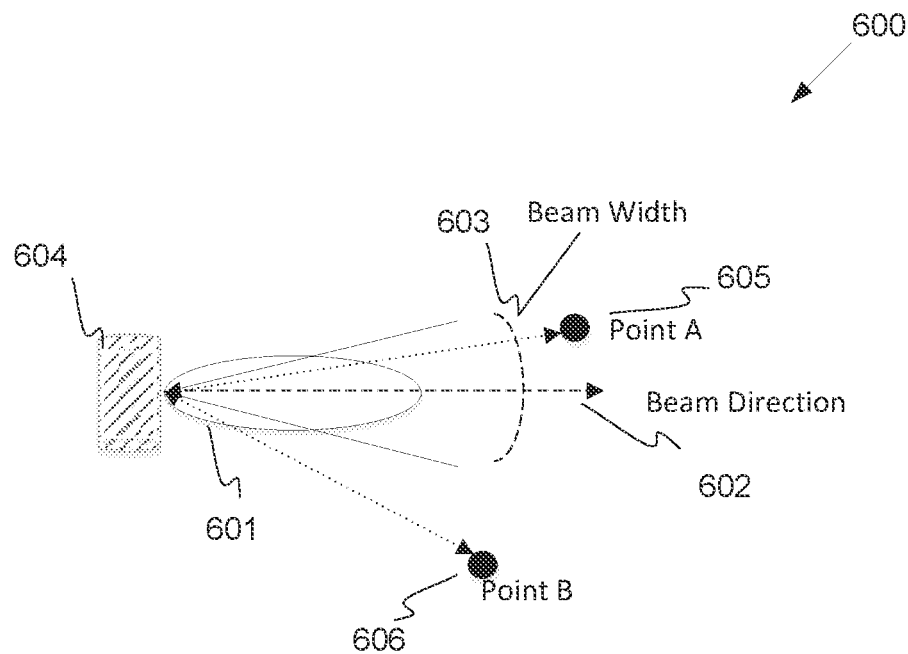
FIG. 6A illustrate an example of wireless system beam according to embodiments of the present disclosure.

FIG. 6A illustrate an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
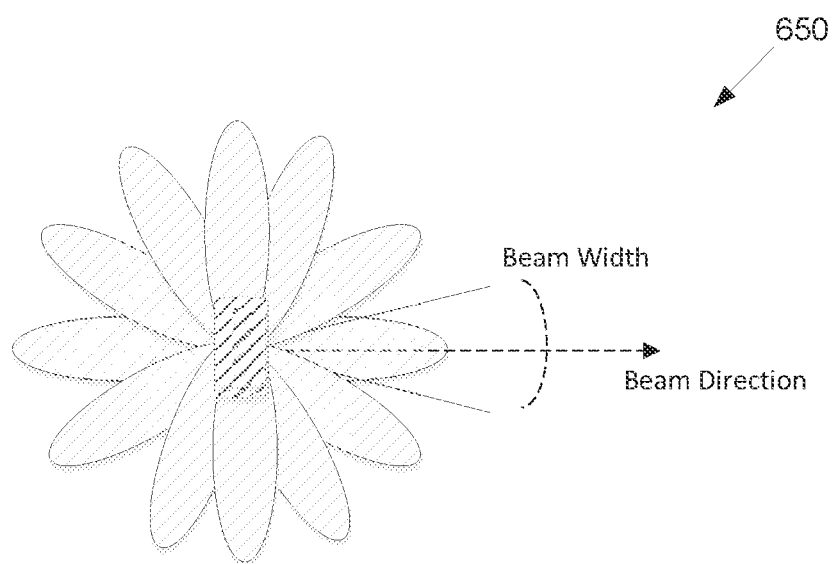
FIG. 6B illustrate an example of multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
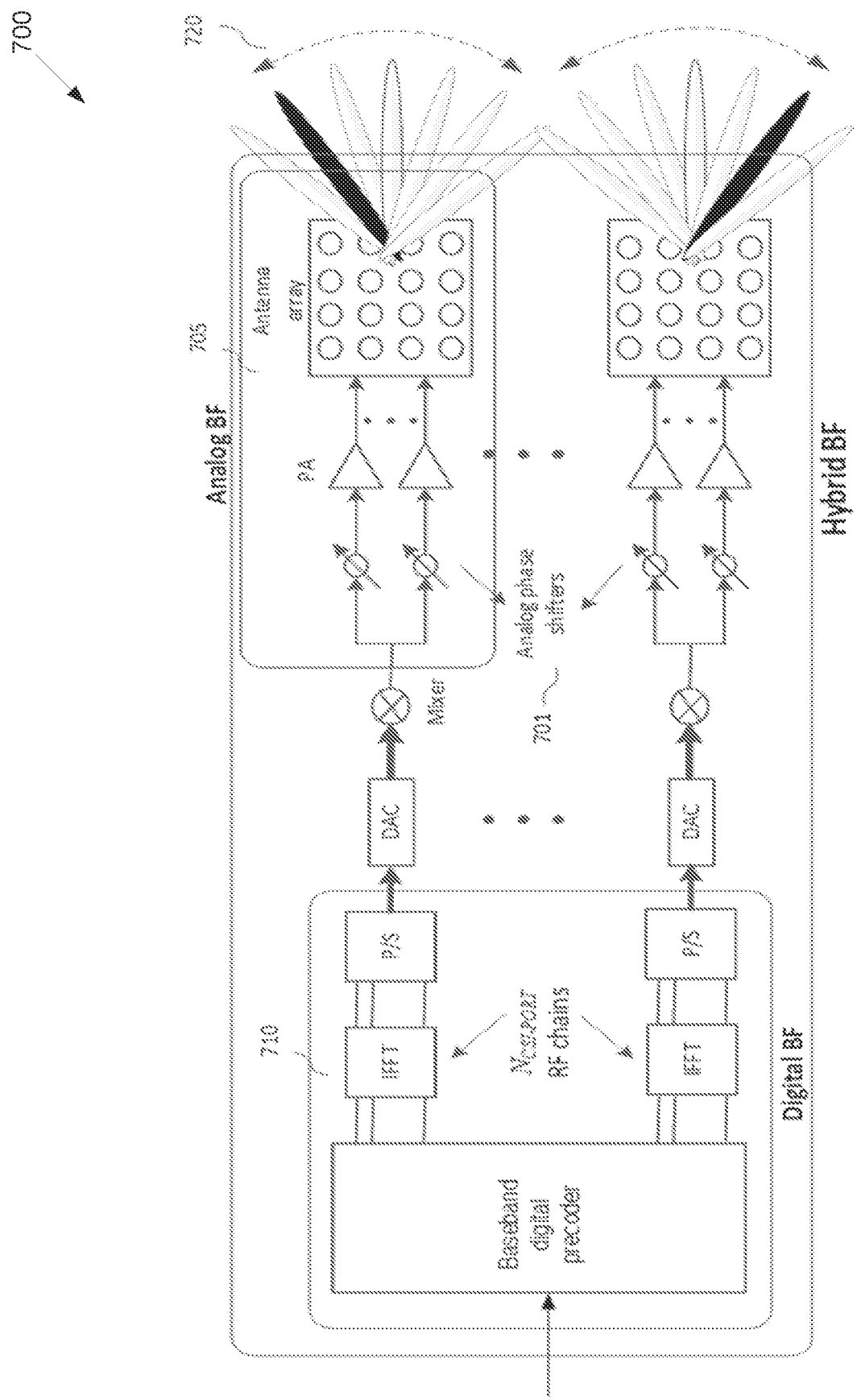
FIG. 7 illustrate an example of antenna structure according to embodiments of the present disclosure.

FIG. 7 illustrate an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

As described in U.S. patent application Ser. No. 17/148,517 filed Jan. 13, 2021, which is incorporated by reference herein in its entirety, a TCI DCI can be a dedicated channel for beam indication information, i.e., a purposed designed DL channel for beam indication. Beam indication information can also be included in a DL-related DCI (e.g., DCI Format 1_0, or DCI Format 1_1, or DCI Format 1_2) or in an UL-related DCI (e.g., DCI Format 0_0, or DCI Format 0_1, or DCI Format 0_2). In this disclosure we cover more detailed aspects related to the configuration and signaling of beam indication relaying on L1 signaling as well as higher layer configuration and signaling.

In release 15/16 a common framework is shared for CSI and beam management, while the complexity of such framework is justified for CSI in FR1, it makes beam management procedures rather cumbersome, and less efficient in FR2. Efficiency here refers to overhead associated with beam management operations and latency for reporting and indicating new beams.

Furthermore, in release 15 and release 16, the beam management framework is different for different channels. This increases the overhead of beam management, and could lead to less robust beam-based operation. For example, for PDCCH the TCI state (used for beam indication), is updated through MAC CE signaling. While the TCI state of PDSCH can be updated through a DL DCI carrying the DL assignment with codepoints configured by MAC CE, or the PDSCH TCI state can follow that of the corresponding PDCCH, or use a default beam indication.

In the uplink direction, the spatialRelationInfo framework is used for beam indication for PUCCH and SRS, which is updated through RRC and MAC CE signaling. For PUSCH the SRI (SRS Resource Indicator), in an UL DCI with UL grants, can be used for beam indication. Having different beam indications and beam indication update mechanisms increases the complexity, overhead and latency of beam management, and could lead to less robust beam-based operation.

For inter-cell mobility, L3-based handover suffers increased overhead due to L3 messages, and higher latency due to the involvement of L3 in the handover process. To streamline the handover process and reduce its overhead and latency L1/L2 centric handover can be utilized, wherein a network indicates to the UE a beam of a non-serving cell using a channel that conveys a TCI state ID. A non-serving cell can be a neighboring cell, or a cell with PCI different from the PCI of the serving cell. In this disclosure, we consider aspects related to the activation and indication of the TCI state IDs for non-serving cells.

The present disclosure relates to a 5G/NR communication system.

The present disclosure considers design aspects related to activation and indication of TCI state IDs for non-serving cells to facilitate L1/L2 centric inter-cell mobility (e.g., inter-cell beam management). A non-serving cell can be a neighboring cell, or a cell with PCI different from the PCI of the serving cell.

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, that is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report (in Rel-15 NR, a beam report includes at least one L1-RSRP accompanied by at least one CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS, or can be configured with a certain time-domain behavior, such as a periodicity and offset in case of periodic RS, or can be a combination of such configuration and activation/deactivation in case of semi-persistent RS.

For mmWave bands (or FR2) or for higher frequency bands (such as >52.6 GHz or FR4) (or for FR2-1 for 24.25-52.6 GHz, and FR2-2 for 52.6-71 GHz (two ranges under the FR2 common range)) where multi-beam operation is especially relevant, a transmission-reception process includes a receiver selecting a receive (RX) beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam. In response, the UE measures the DL RS, and in the process selects a DL RX beam, and reports the beam metric associated with the quality of the DL RS.

In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs. Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RS s, either per reference RS or by "beam sweeping," and determine all TX-RX beam pairs associated with all the UL RSs configured to the UE to transmit.

The following two embodiments (A-1 and A-2) are examples of DL multi-beam operations that utilize DL-TCI-state based DL beam indication. In the first example embodiment (A-1), an aperiodic CSI-RS is transmitted by the NW/gNB and received/measured by the UE. This embodiment can be used regardless of whether or not there is UL-DL beam correspondence. In the second example embodiment (A-2), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

Figure 8:
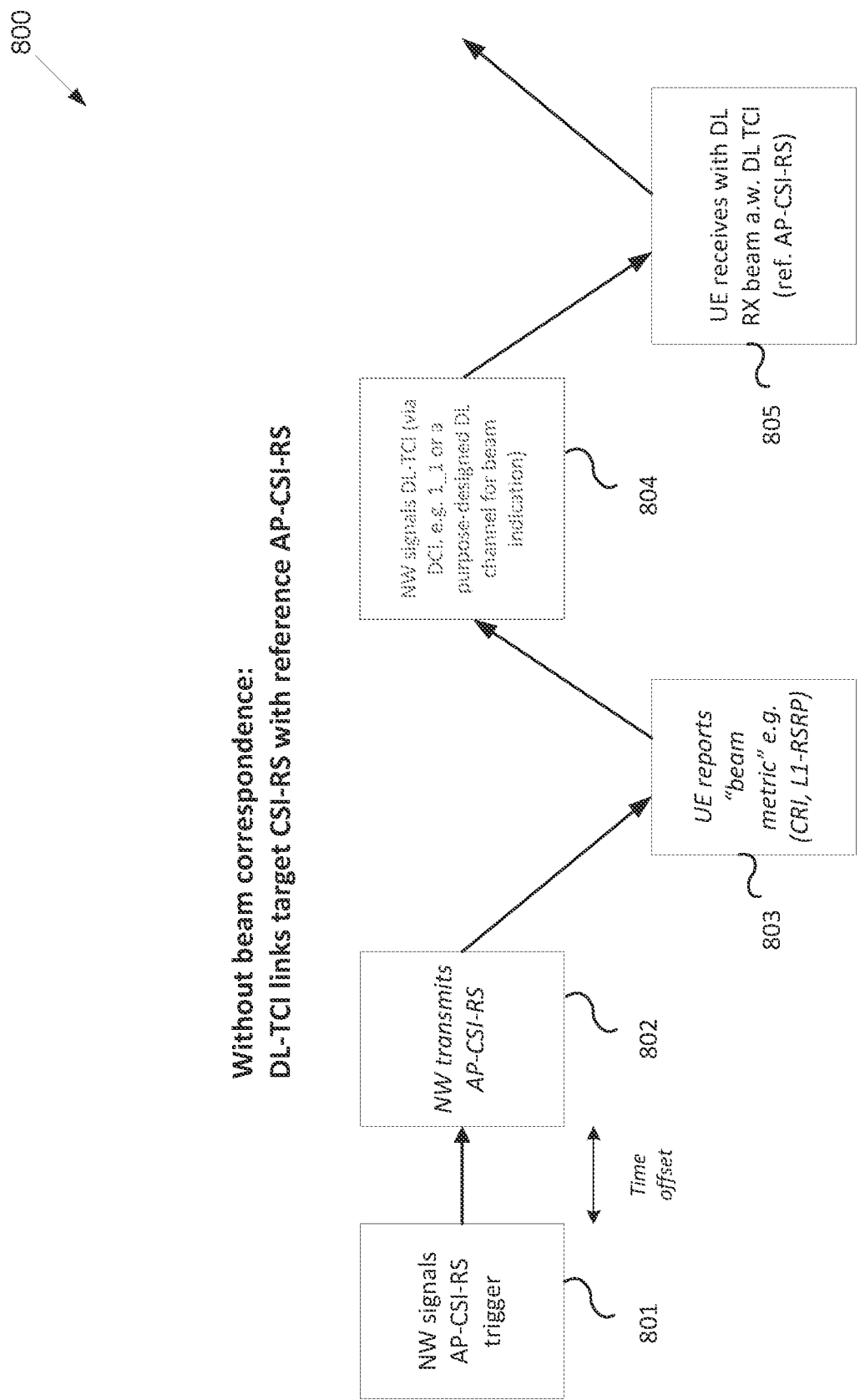
FIG. 8 illustrates an example of DL multi beam operation according to embodiments of the present disclosure.

FIG. 8 illustrates an example of DL multi beam operation 800 according to embodiments of the present disclosure. The DL multi beam operation 800 as may be performed by a UE (e.g., 111-116 as illustrated in FIG. 1) and a BS (e.g., 101-103 as illustrated in FIG. 1). An embodiment of the DL multi beam operation 800 shown in FIG. 8 is for illustration only.

In one example illustrated in FIG. 8 (embodiment A-1), a DL multi-beam operation 800 starts with the gNB/NW signaling to a UE an aperiodic CSI-RS (AP-CSI-RS) trigger or indication (step 801). This trigger or indication can be included in a DCI and indicate transmission of AP-CSI-RS in a same (zero time offset) or in a later slot/sub-frame (>0 time offset).

For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 802), the UE measures the AP-CSI-RS and calculates and reports a "beam metric" that indicates a quality of a particular TX beam hypothesis (step 803). Examples of such beam reporting are a CSI-RS resource indicator (CRI), or a SSB resource indicator (SSB-RI), coupled with an associated L1-RSRP/L1-RSRQ/L1-SINR/CQI.

Upon receiving the beam report from the UE, the gNB/NW can use the beam report to select a DL RX beam for the UE and indicate the DL RX beam selection (step 804) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a. CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 805).

Alternatively, the gNB/NW can use the beam report to select a DL RX beam for the UE and indicate to the UE the selected DL RX beam (step 804) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS).

In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 805).

For this embodiment (A-1), as described above, the UE selects a DL RX beam using an index of a reference RS, such as an AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

Figure 9:
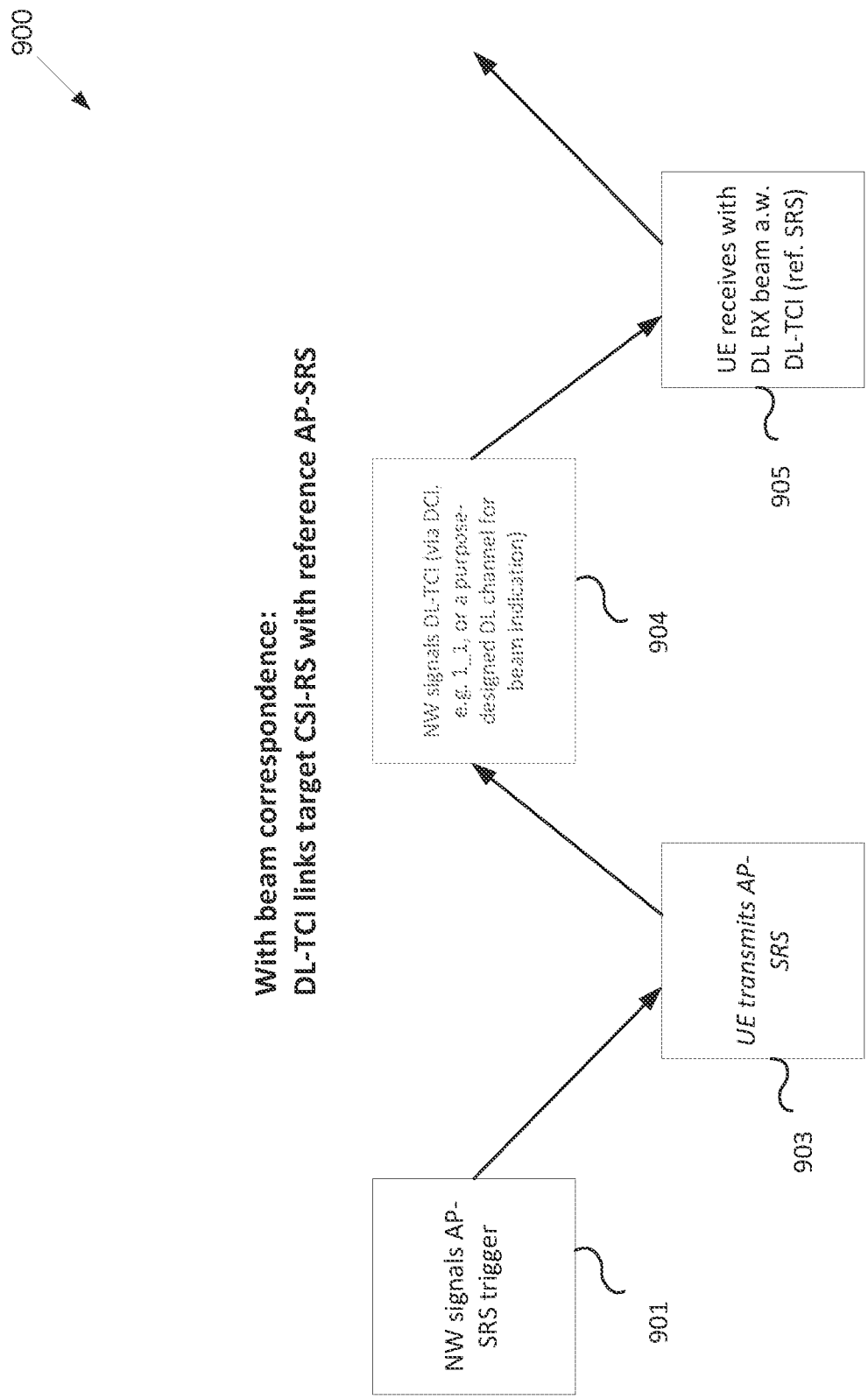
FIG. 9 illustrates an example of DL multi beam operation according to embodiments of the present disclosure.

FIG. 9 illustrates an example of DL multi beam operation 900 according to embodiments of the present disclosure. The DL multi beam operation 900 as may be performed by a UE (e.g., 111-116 as illustrated in FIG. 1) and a BS (e.g., 101-103 as illustrated in FIG. 1). An embodiment of the DL multi beam operation 900 shown in FIG. 9 is for illustration only.

In another example illustrated in FIG. 9 (embodiment A-2), an DL multi-beam operation 900 starts with the gNB/NW signaling to a UE an aperiodic SRS (AP-SRS) trigger or request (step 901). This trigger can be included in a DCI format such as for example a DCI format scheduling a PDSCH reception or a PUSCH transmission. Upon receiving and decoding the DCI format with the AP-SRS trigger (step 902), the UE transmits an SRS (AP-SRS) to the gNB/NW (step 903) so that the NW (or gNB) can measure the UL propagation channel and select a DL RX beam for the UE for DL (at least when there is beam correspondence).

The gNB/NW can then indicate the DL RX beam selection (step 904) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 905).

Alternatively, the gNB/NW can indicate the DL RX beam selection (step 904) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 905).

For this embodiment (A-2), as described above, the UE selects the DL RX beam based on the UL TX beam associated with the reference RS (AP-SRS) index signaled via the TCI-state field.

Similar, for UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RSs, either per reference RS or by "beam sweeping," and determine all the TX-RX beam pairs associated with all the reference RSs configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In the first example embodiment (B-1), a NW transmits an aperiodic CSI-RS and a UE receives and measures the CSI-RS. This embodiment can be used, for instance, at least when there is reciprocity between the UL and DL beam-pair-link (BPL). This condition is termed "UL-DL beam correspondence."

In the second example embodiment (B-2), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

Figure 10:
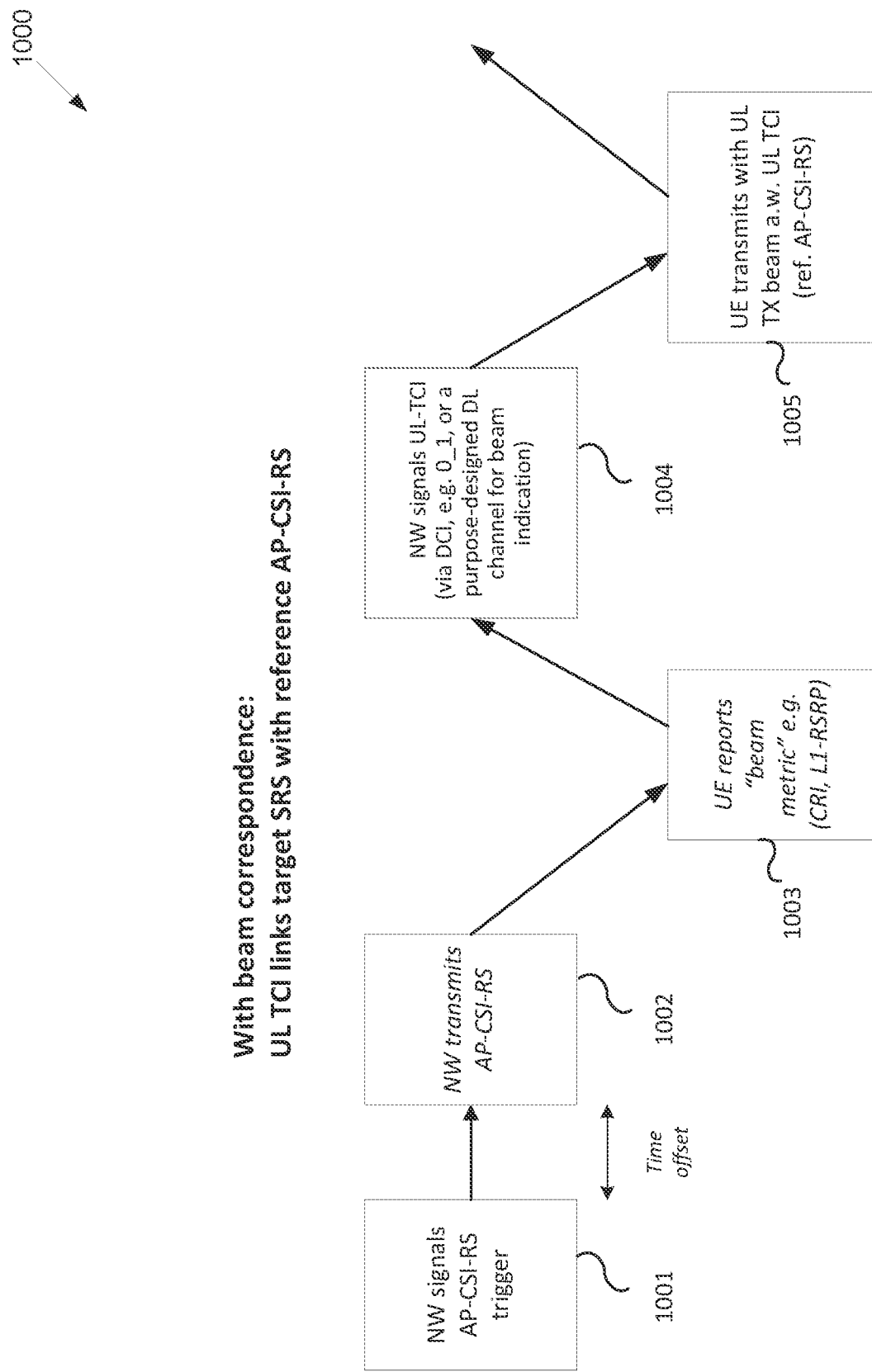
FIG. 10 illustrates an example of UL multi beam operation according to embodiments of the present disclosure.

FIG. 10 illustrates an example of UL multi beam operation 1000 according to embodiments of the present disclosure. The DL multi beam operation 1000 as may be performed by a UE (e.g., 111-116 as illustrated in FIG. 1) and a BS (e.g., 101-103 as illustrated in FIG. 1). An embodiment of the UL multi beam operation 1000 shown in FIG. 10 is for illustration only.

In one example illustrated in FIG. 10 (embodiment B-1), an UL multi-beam operation 1000 starts with the gNB/NW signaling to a UE an aperiodic CSI-RS (AP-CSI-RS) trigger or indication (step 1001). This trigger or indication can be included in a DCI format, such as a DCI format scheduling a PDSCH reception to the UE or a PUSCH transmission from the UE and can be either separately or jointly signaled with an aperiodic CSI request/trigger, and indicate transmission of AP-CSI-RS in a same slot (zero time offset) or in a later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1005).

Alternatively, the gNB/NW can use the beam report to select an UL TX beam for the UE and indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS).

In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 1005).

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

Figure 11:
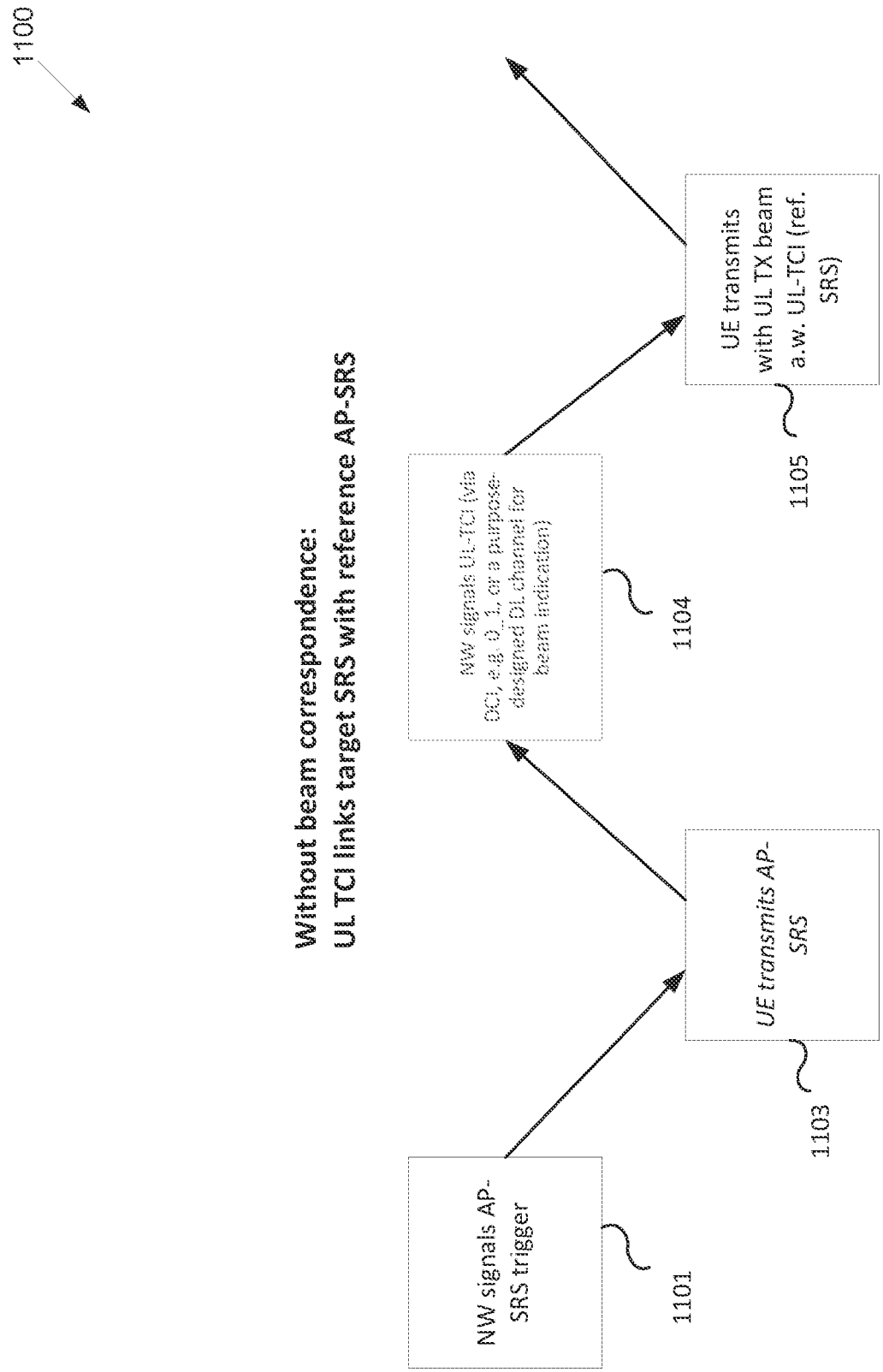
FIG. 11 illustrates an example of UL multi beam operation according to embodiments of the present disclosure.

FIG. 11 illustrates an example of UL multi beam operation 1100 according to embodiments of the present disclosure. The DL multi beam operation 1100 as may be performed by a UE (e.g., 111-116 as illustrated in FIG. 1) and a BS (e.g., 101-103 as illustrated in FIG. 1). An embodiment of the UL multi beam operation 1100 shown in FIG. 11 is for illustration only.

In another example illustrated in FIG. 11 (embodiment B-2), an UL multi-beam operation 1100 starts with the gNB/NW signaling to a UE an aperiodic SRS (AP-SRS) trigger or request (step 1101). This trigger can be included in a DCI format, such as a DCI format scheduling a PDSCH reception or a PUSCH transmission. Upon receiving and decoding the DCI format with the AP-SRS trigger (step 1102), the UE transmits AP-SRS to the gNB/NW (step 1103) so that the NW (or gNB) can measure the UL propagation channel and select an UL TX beam for the UE.

The gNB/NW can then indicate the UL TX beam selection (step 1104) using a value of the TCI-state field in the DCI format. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1105).

Alternatively, a gNB/NW can indicate the UL TX beam selection (step 1104) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1105).

For this embodiment (B-2), as described above, the UE selects the UL TX beam from the reference RS (in this case SRS) index signaled via the value of the TCI-state field.

In any of the following components, examples and sub-examples, flowcharts and diagrams maybe used for illustrative purposes. The present disclosure covers any possible variation of the flowcharts and diagrams as long as at least some of the components are included.

In the following components, a TCI state is used for beam indication. It can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

For high-speed applications, L1/L2-centric inter-cell mobility or inter-cell beam management has been provided in FeMIMO for 3GPP standard specification release 17, to reduce handover latency. A beam measurement report from a UE can include up to K beams associated with at least a non-serving cell, wherein for each beam the UE can report; a measured RS indicator and the beam metric (e.g., L1-RSRP, L3-RSRP, L1-SINR, etc.) associated with the measured RS indicator. A non-serving cell can be a neighboring cell, or a cell with PCI different from the PCI of the serving cell.

Upon receiving beam measurement reports with beam measurements from non-serving cells and/or the serving cells, the network can decide, based on the beam measurement reports to indicate a beam (e.g., a TCI state or a spatial relation) for non-serving cell for reception and/or transmission of DL and/or UL UE channels respectively.

There are a few scenarios to consider below.

In one example of Case 1, a UE switches beams from a serving cell to a non-serving cell. The prior beam indication, i.e., beam indication currently used by the UE for the reception and/or transmission of DL and/or UL channels is associated with the serving cell (i.e., having source RS on serving cell). The new beam indication (e.g., TCI state or spatial relation) is associated with a non-serving cell (i.e., having source RS on non-serving cell).

In another example of Case 2, a UE switches beams within a non-serving cell. The prior beam indication, i.e., beam indication currently used by the UE for the reception and/or transmission of DL and/or UL channels is associated with a non-serving cell (i.e., having source RS on non-serving cell). The new beam indication (e.g., TCI state or spatial relation) is associated with the non-serving cell (i.e., having source RS on the non-serving cell).

In yet another example of Case 3, a UE switches beams from a non-serving cell to a serving cell. The prior beam indication, i.e., beam indication currently used by the UE for the reception and/or transmission of DL and/or UL channels is associated with a non-serving cell (i.e., having source RS on non-serving cell). The new beam indication (e.g., TCI state or spatial relation) is associated with a serving cell (i.e., having source RS on serving cell).

In yet another example of Case 4, a UE switches beams from a first non-serving cell to a second non-serving cell. The prior beam indication, i.e., beam indication currently used by the UE for the reception and/or transmission of DL and/or UL channels is associated with a first non-serving cell (i.e., having source RS on first non-serving cell). The new beam indication (e.g., TCI state or spatial relation) is associated with a second non-serving cell (i.e., having source RS on second non-serving cell).

Beams can be associated with different tracking loops. A tracking loop refers to time and/or frequency tracking. For example, if the entities transmitting and/or receiving the beams to and/or from the UE are associated with different synchronization sources, different tracking loops can be used.

An entity in the present disclosure can be: (1) one or more cells, wherein one cell can be associated with one or more physical cell IDs (PCIs); (2) one or more PCIs; (3) one or more TRPs; (4) one or more TRP panels; (5) one or more component carriers; (6) one or more SSBs; (7) one or more UE panels; (8) one or more BWPs; (9) one or more frequency spans (e.g., PRBs or sub-carriers); (10) one or more time intervals (e.g., slots or symbols); and/or (11) one or more antenna ports.

An entity can be a combination of one or more of the above, for example an entity can be one or more component carriers on one or more TRPs.

As an example, a first entity can be a serving cell, a second entity can be a first non-serving cell, a third entity can be a second non-serving cell, and so on. Here, a non-serving cell can be a neighboring cell, or a cell with PCI different from the PCI of the serving cell.

In this disclosure beams are organized into groups. Beams within a group are transmitted and/or received from a same entity. Beams within a group have a same tracking loop.

Figure 12:
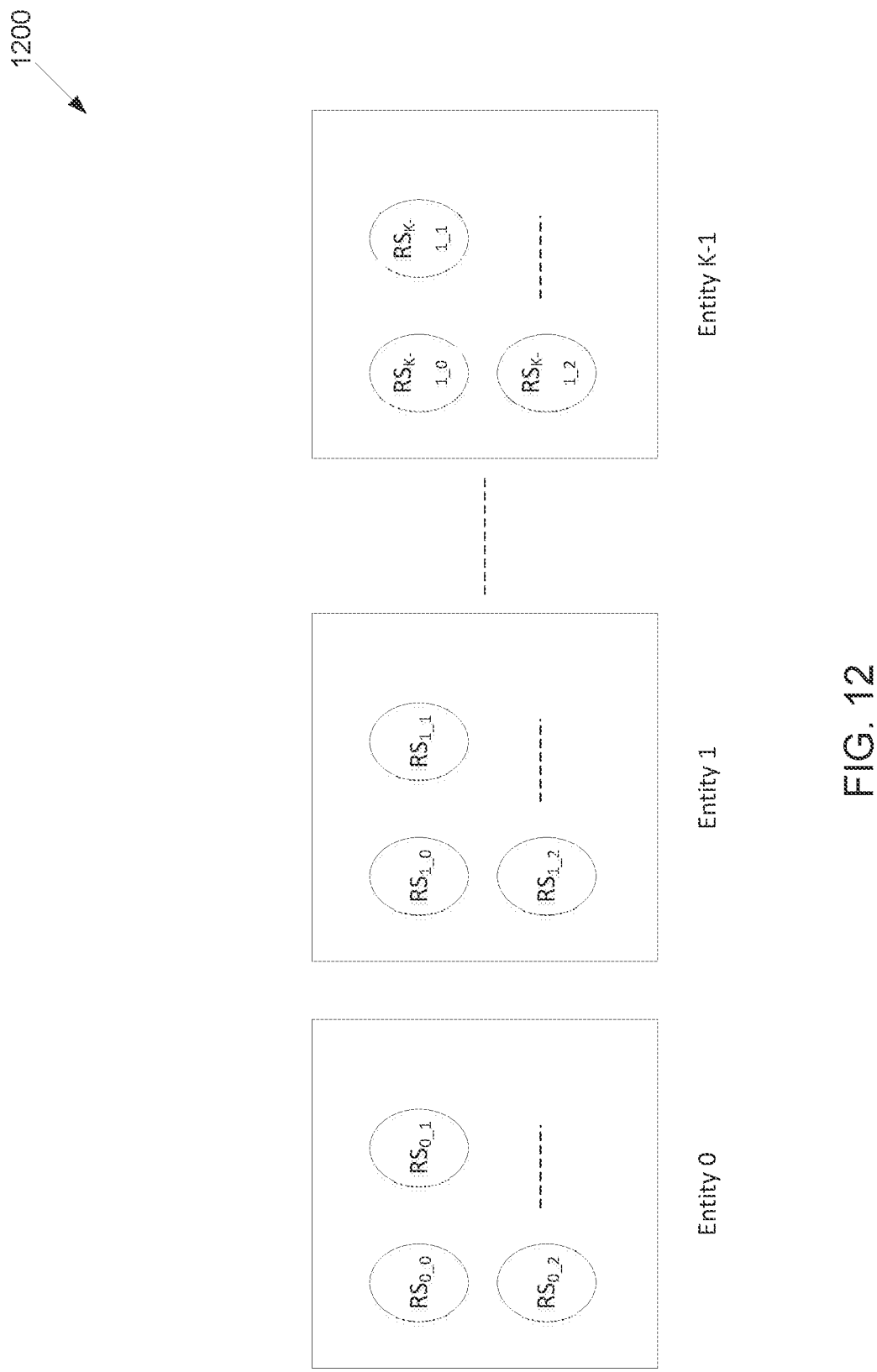
FIG. 12 illustrates an example of partitioning source RS according to embodiments of the present disclosure.

FIG. 12 illustrates an example of partitioning source RS 1200 according to embodiments of the present disclosure. An embodiment of the partitioning source RS 1200 shown in FIG. 12 is for illustration only.

In various embodiments of a component 1 of the present disclosure, a network can configure a UE with source RS resources for up to K entities as shown in FIG. 12. A first entity can be configured up to $M_0$ source RS. A second entity can be configured up to $M_1$ source RS ... a $K^{th}-1$ entity can be configured up to $M_K-1$ source RS.

In one example, $M_0, M_1, \ldots M_{K-1}$ can be different.

In another example, $M_0=M_1=\ldots=M_{K-1}=M$.

In yet another example, a subset of $M_i$'s can have one value, a second subset of $M_i$'s can have a second value and so on.

The maximum number of entities, i.e., beam groups, K can be at least one of: (1) based on a UE capability; (2) specified in system specifications; and/or (3) configured and/or updated by higher layer signaling, e.g., MAC CE signaling and/or RRC signaling.

In one example, Entity 0 can correspond to a first cell (e.g., a serving cell with Physical Cell Identity (PCI), $PCI_s$). Entity 1 can correspond to a second cell (e.g., a first non-serving cell with PCI $PCI_{ns1}$). Entity 2 can correspond to a third cell (e.g., a second non-serving cell with PCI $PCI_{ns2}$), and so on.

In another example, Entity 0 can correspond to a first TRP. Entity 1 can correspond to a second TRP. Entity 2 can correspond to a third TRP, and so on.

In another example, Entity 0 can correspond to a first group of cells. Entity 1 can correspond to a second group of cells. Entity 2 can correspond to a third group of cells, and so on. In one example, the grouping of cells can be based on the time advance (TA) value, which determines the UL transmission time to the cell. Cells with the same uplink transmission time, or with uplink transmission time within a cyclic prefix (CP) duration are in a same group.

In another example, Entity 0 can correspond to a first group of TRPs. Entity 1 can correspond to a second group of TRPs. Entity 2 can correspond to a third group of TRPs, and so on. In one example, the grouping of TRPs can be based on the time advance (TA) value, which determines the UL transmission time to the TRP. TRPs with the same uplink transmission time, or with uplink transmission time within a cyclic prefix (CP) duration are in a same group.

In another example, Entity 0 can correspond to a first TRP or a first group of TRPs on a first cell (e.g., a serving cell with Physical Cell Identity (PCI), $PCI_s$), Entity 1 can correspond to a second TRP or a second group of TRPs on a first cell (e.g., a serving cell with Physical Cell Identity (PCI), $PCI_s$), Entity 2 can correspond to a third TRP or a third group of TRPs on a second cell (e.g., a first non-serving cell with PCI $PCI_{ns1}$), Entity 3 can correspond to a fourth TRP or a fourth group of TRPs on a second cell (e.g., a first non-serving cell with PCI $PCI_{ns1}$), and so on.

Figure 13:
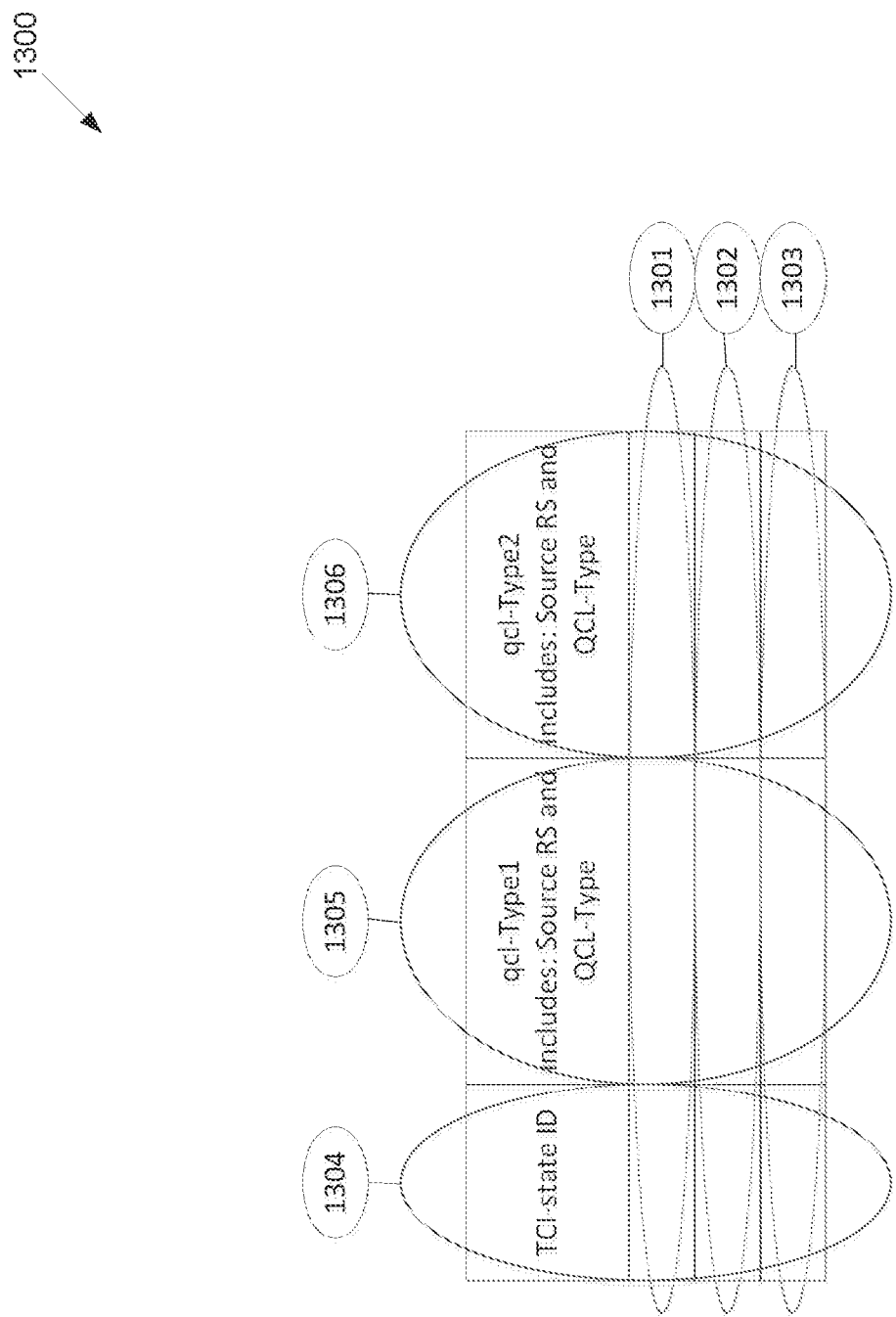
FIG. 13 illustrates an example of TCI state identifier (ID) according to embodiments of the present disclosure.

FIG. 13 illustrates an example of TCI state ID 1300 according to embodiments of the present disclosure. An embodiment of the TCI state ID 1300 shown in FIG. 13 is for illustration only.

In various embodiments of a component 2 of the present disclosure, a TCI-state configuration associates a TCI state ID with one or more source RS as illustrated in FIG. 13. A TCI-state configuration table contains a row for each TCI-state ID (1301, 1302, 1303). Each row contains a TCI-state ID (1304), QCL-Type1 (1305) and optionally QCL-Type2 (1306). Each QCL-Type includes a source reference signal and a QCL-Type, where the QCL-Type can be Type-A, Type-B, Type-C or Type-D. Each TCI-state can have at most 1 QCL-Type-D. For example, qcl-Type1 can be of QCL-Type A, while qcl-Type2 can be of QCL-Type D. A reference signal can be a reference signal of an entity as illustrated in FIG. 12.

In one example, the source RS of qcl-Type1 and the source RS of qcl-Type2, if applicable, can be one of: (1) the same source RS, wherein the source RS can be at least one of the following: (i) synchronization signal (SS)/physical broadcast channel (PBCH) block (SSB), (ii) non-zero power (NZP) channel state information—reference signal (CSI-RS), with trs-info enabled. Also known as CSI-RS for tracking or as tracking reference signal (TRS), (iii) NZP CSI-RS, without trs-info enabled, and with repetition on of serving cell. Also known as CSI-RS for beam management, (iv) NZP CSI-RS, without trs-info enabled, and with repetition on, also known as CSI-RS for beam management, and/or (v) sounding reference signal (SRS), for beam management; and (2) different source RS's from the same entity. Table 1 shows examples of the source reference RS of a first QCL information (e.g., with QCL Type A) and a second QCL information (e.g., with QCL Type D).

TABLE 1

Example combinations: Source RS for first QCL Info with Type A and a second QCL info with Type D

| Source Reference Signal for a first QCL Type (e.g., QCL Type A) | Source Reference Signal for a second QCL Type (e.g., QCL Type D) |
| --- | --- |
| TRS (CSI-RS for tracking) | SSB |
| TRS (CSI-RS for tracking) | CSI-RS for beam management |
| TRS (CSI-RS for tracking) | CSI-RS for CSI |
| TRS (CSI-RS for tracking) | SRS for beam management |
| CSI-RS for CSI | SSB |
| CSI-RS for CSI | CSI-RS for beam management |
| CSI-RS for CSI | SRS for beam management |
| CSI-RS for CSI | TRS (CSI-RS for tracking) |
| SSB | CSI-RS for beam management |
| SSB | SRS for beam management |
| SSB | TRS (CSI-RS for tracking) |
| SSB | CSI-RS for CSI |
| CSI-RS for beam management | SSB |
| CSI-RS for beam management | SRS for beam management |
| CSI-RS for beam management | TRS (CSI-RS for tracking) |
| CSI-RS for beam management | CSI-RS for CSI |

In the unified TCI framework as described in U.S. patent application Ser. No. 17/584,239 filed Jan. 25, 2022, which is incorporated by reference herein in its entirety, M≥1 DL TCI states and/or N≥1 uplink TCI states can be indicated to a UE, wherein the indicated TCI state can be indicated as at least one of: (1) TCI state IDs for indication of DL TCI states; (2)

TCI state IDs for indication of UL TCI states; (3) TCI state IDs for indication of joint DL/UL TCI states; and/or (4) TCI state IDs for indication of separate DL TCI state and UL TCI state.

Figure 14:
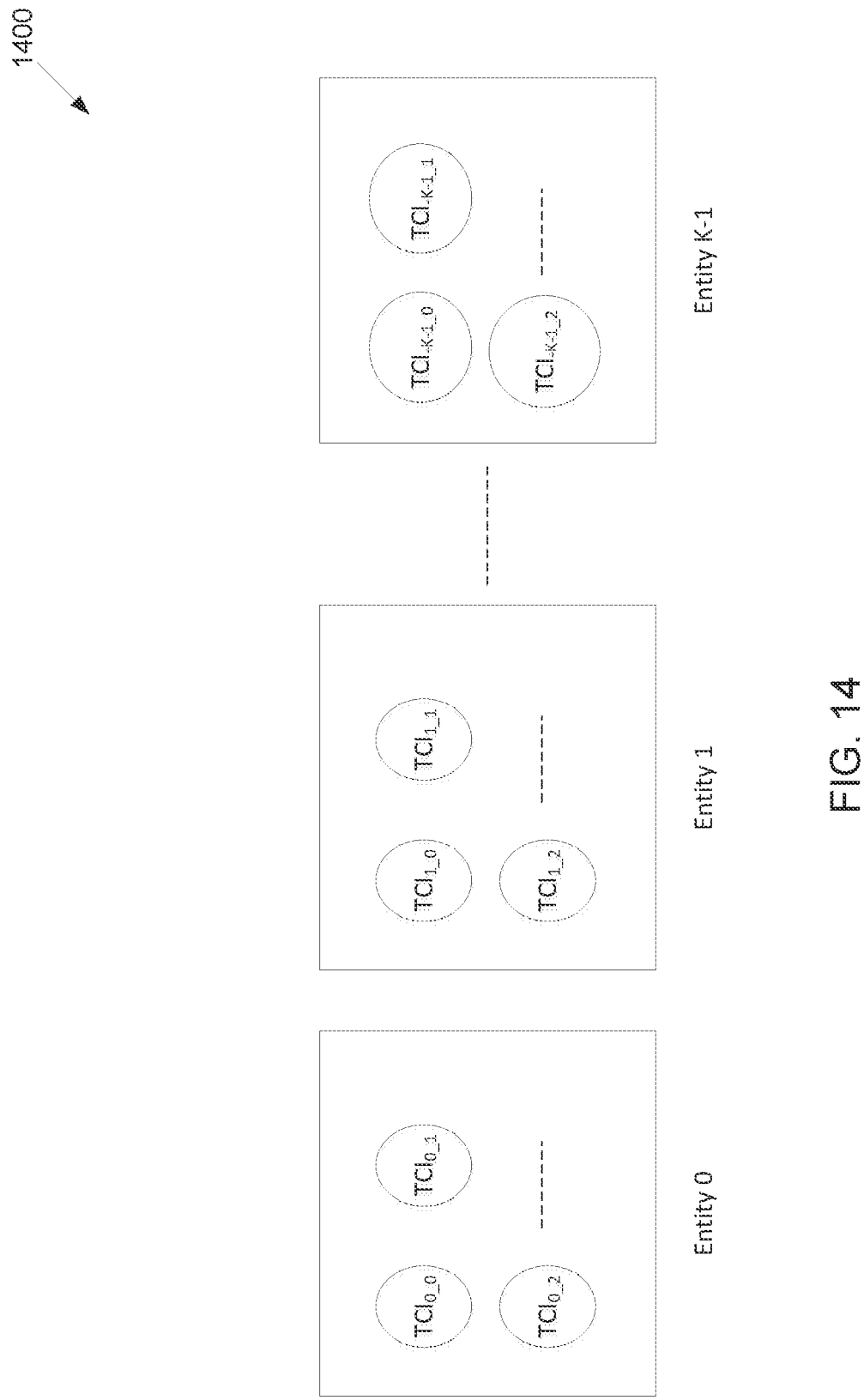
FIG. 14 illustrates an example of TCI partitioning according to embodiments of the present disclosure.

FIG. 14 illustrates an example of TCI partitioning 1400 according to embodiments of the present disclosure. An embodiment of the TCI partitioning 1400 shown in FIG. 14 is for illustration only.

The TCI states/TCI state IDs are partitioned into K groups, corresponding to the K entities as illustrated in FIG. 14. The association of a TCI state/TCI state ID to an entity is according to the association of the corresponding source RS to that entity.

A beam (i.e., a TCI state) can be indicated to a UE by a channel conveying a beam indication (i.e., a TCI state ID), which can be one of: (1) a DL related DCI, i.e., a DCI format for scheduling PDSCH in one cell, such as DCI Format 1_0, DCI Format 1_1 or DCI Format 1_2: (i) in one example, a DL related DCI format can include a DL resource assignment, and (ii) in another example, a DL related DCI format doesn't include a DL assignment; (2) an UL related DCI, i.e., a DCI format for scheduling PUSCH in one cell, such as DCI Format 0_0, DCI Format 0_1 or DCI Format 0_2: (i) in one example, an UL related DCI format can include an UL scheduling grant, and (ii) in another example, an UL related DCI format doesn't include an UL scheduling grant; (3) a purpose designed DCI format for TCI state indication: (i) in one example, a purpose designed DCI format for TCI state indication for one UE, and (ii) in another example, a purpose designed DCI format for TCI state indication for a group of UEs; and (4) a MAC CE for TCI state indication: (i) in one example, a MAC CE for TCI state indication for one UE, and (ii) in another example, a MAC CE for TCI state indication for a group of UEs.

Figure 15:
FIG. 15 illustrates an example of TCI state ID configuration according to embodiments of the present disclosure.

FIG. 15 illustrates an example of TCI state ID configuration 1500 according to embodiments of the present disclosure. An embodiment of the TCI state ID configuration 1500 shown in FIG. 15 is for illustration only.

Figure 16:
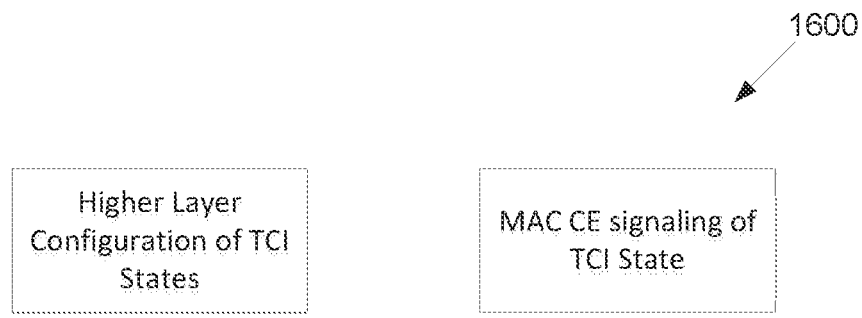
FIG. 16 illustrates another example of TCI state ID configuration according to embodiments of the present disclosure.

FIG. 16 illustrates another example of TCI state ID configuration 1600 according to embodiments of the present disclosure. An embodiment of the TCI state ID configuration 1600 shown in FIG. 16 is for illustration only.

Figure 17:
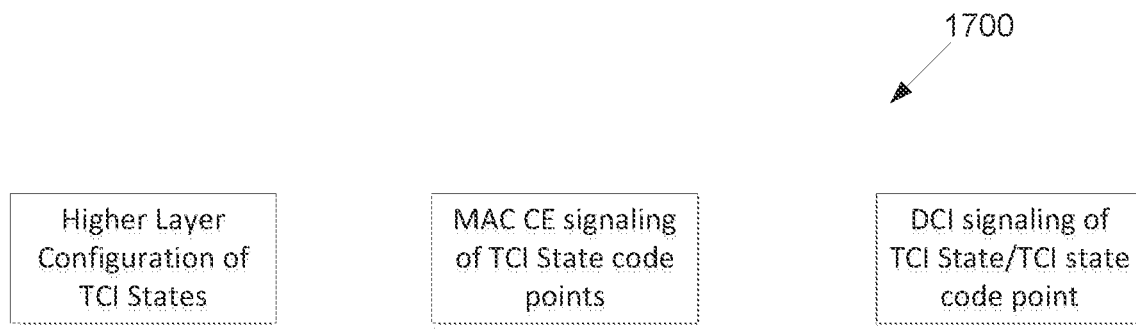
FIG. 17 illustrates yet another example of TCI state ID configuration according to embodiments of the present disclosure.

FIG. 17 illustrates yet another example of TCI state ID configuration 1700 according to embodiments of the present disclosure. An embodiment of the TCI state ID configuration 1700 shown in FIG. 17 is for illustration only.

A TCI state ID/TCI state code point in a channel conveying a beam indication can be at least one of: (1) a TCI state ID configured by RRC signaling as illustrated in FIG. 15 and FIG. 16; and (2) a TCI state ID activated by MAC CE signaling, wherein the TCI state IDs are configured by RRC signaling and a sub-set of the TCI state IDs are activated by MAC CE signaling, wherein in the activated TCI states corresponds to codepoints for the channel conveying the TCI state IDs. This is illustrated in FIG. 17.

FIG. 18 illustrates an example of TCI state 1800 according to embodiments of the present disclosure. An embodiment of the TCI state 1800 shown in FIG. 18 is for illustration only.

Regarding FIG. 15 and FIG. 16, in one example 2.1.1, the TCI state IDs configured are arranged first in order within each entity and then in order across entities as illustrated in FIG. 18. For $TCI_{k\_m}$, i.e., TCI state ID m configured for entity k, the TCI state ID codepoint in channel conveying beam indication can be obtained as: TCI State ID=$\sum_{i=0}^{k-1} M_i$+m, wherein, $M_i$ is the number of TCI state IDs configured for entity i.

In another example, if $M_0=M_1=\ldots=M_{K-1}=M$, for $TCI_{k\_m}$, i.e., TCI state ID m configured for entity k, the TCI state ID codepoint in channel conveying beam indication can be obtained as: TCI State ID=k×M+m.

In yet another example, $M_{max}$=max($M_0, M_1, \ldots M_{K-1}$), for $TCI_{k\_m}$, i.e., TCI state ID m configured for entity k, the TCI state ID codepoint in channel conveying beam indication can be obtained as: TCI State ID=k×$M_{max}$+m.

FIG. 19 illustrates an example of TCI state with two parts 1900 according to embodiments of the present disclosure. An embodiment of the TCI state with two parts 1900 shown in FIG. 19 is for illustration only.

In another example 2.1.2, the TCI state ID includes two fields as illustrated in FIG. 19: (1) a first field that includes an ID of an entity whose TCI state is being indicated. The size of this field is $\lceil \log_2 K \rceil$ bits. Wherein, K is the number of configured entities; and (2) a second field that includes an ID of the TCI state for the entity. The size of this field is $\lceil \log_2 \max(M_0, M_1, \ldots, M_{K-1}) \rceil$ bits. In one further example, if $M_0=M_1=\ldots=M_{K-1}=M$, the size of this field is $\lceil \log_2 M \rceil$ bits. Wherein, $M_i$ is the number of configured TCI states/TCI state IDs for entity i. M is the number of configured TCI states/TCI state IDs for any entity of the same across entities.

In another example 2.1.3, the channel conveying the TCI state ID indicates more than one TCI state/TCI state IDs, wherein the TCI state/TCI state IDs can correspond to DL TCI state(s) and/or UL TCI state(s) and/or joint DL/UL TCI state(s) and/or separate DL/UL TCI states.

In one example 2.1.3.1, the channel conveying the TCI state ID, indicates TCI state IDs for a same entity.

In one example 2.1.3.1.1, the channel conveying the TCI state ID includes a field for entity ID, wherein the size of this field is $\lceil \log_2 K \rceil$ bits, wherein, K is the number of configured entities. Furthermore, the channel conveying the TCI state ID includes one or more fields for the ID of the TCI state within the entity, wherein the size of each field is $\lceil \log_2 \max(M_0, M_1, \ldots, M_{K-1}) \rceil$ bits. In one further example, if $M_0=M_1=\ldots=M_{K-1}=M$, the size of this field is $\lceil \log_2 M \rceil$ bits. Wherein, $M_i$ is the number of configured TCI states/TCI state IDs for entity i. M is the number of configured TCI states/TCI state IDs for any entity of the same across entities.

In another example 2.1.3.1.2, the channel conveying the TCI state ID includes a field for entity ID. Furthermore, the channel conveying the TCI state ID includes a bitmap for the configured TCI state IDs for the entity, with a bit corresponding to each TCI state ID. A value of 1 in a bit is used to indicate the corresponding TCI state ID. The length of the bitmap field can be max($M_0, M_1, \ldots, M_{K-1}$), or M, if $M_0=M_1=\ldots=M_{K-1}=M$. Unused bits in the bitmap can be reserved. The reserved bits can be the most significant bits or the least significant bits.

In another example 2.1.3.2, the channel conveying the TCI state ID, indicates TCI state IDs for different entities.

In one example 2.1.3.2.1, each indicated TCI state/TCI state ID includes an entity ID and a TCI state ID within the entity ID. This is as illustrated in FIG. 19.

In another example 2.1.3.2.2, the indicated TCI states/TCI state IDs can be expressed as a bitmap with one bit for each configured entity ID with its associated TCI state/TCI state ID. Wherein, the TCI state IDs configured are arranged within the bitmap first in order within each entity and then in order across entities. A value of 1 in a bit is used to indicate the corresponding TCI state ID.

In another example 2.1.3.2.3, the indicated TCI states/TCI state IDs can be expressed as one or more entities followed by a bitmap for each entity. Wherein, for each bitmap one bit is associated with the configured TCI state ID of the corresponding entity. A value of 1 in a bit is used to indicate the corresponding TCI state ID.

In another example 2.1.3.2.4, the indicated TCI states/TCI state IDs can be expressed as one or more entities followed by a list of indicated TCI state IDs for each entity. The number of TCI state IDs indicated for each entity can be included in the channel conveying the TCI state ID. In another example, a same number of TCI state IDs can be indicated for each entity, wherein the number of indicated TCI state IDs can be included in the channel conveying the TCI state ID, configured or updated by MAC CE signaling and/or RRC signaling and/or specified in system specifications.

In another example 2.1.3.2.5, the indicated TCI states/TCI state IDs can be expressed as a bit map of entities, wherein a value of 1 in a bit is used to indicate the corresponding entity, followed by a bitmap for each entity. Wherein, for each bitmap one bit is associated with the configured TCI state ID of the corresponding entity. A value of 1 in a bit is used to indicate the corresponding TCI state ID.

In the example of FIG. 17, higher layer signaling configures TCI states/TCI state IDs according to FIG. 14. MAC CE activates a subset of TCI states for beam indication by a channel conveying TCI state IDs.

Figure 20:
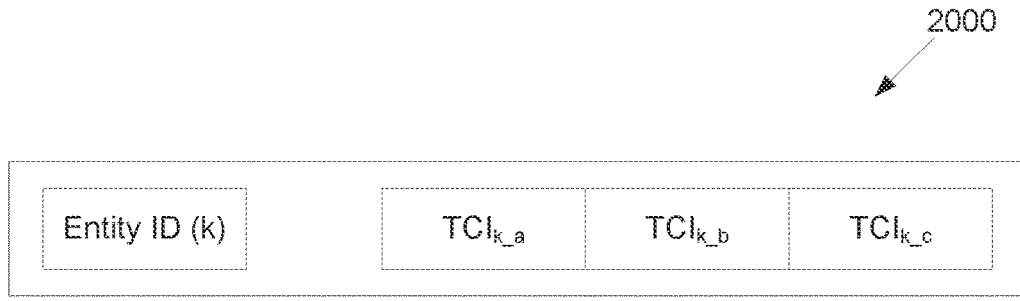
FIG. 20 illustrates an example of MAC CE with TCI state according to embodiments of the present disclosure.

FIG. 20 illustrates an example of MAC CE with TCI state 2000 according to embodiments of the present disclosure. An embodiment of the MAC CE with TCI state 2000 shown in FIG. 20 is for illustration only.

Figure 21:
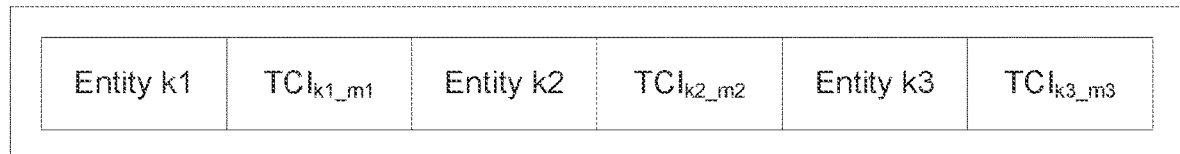
FIG. 21 illustrates another example of MAC CE with TCI state according to embodiments of the present disclosure.

In one example 2.2.1, the MAC CE activation message, activates TCI states/TCI state IDs belonging to a same entity. As an example, a MAC CE activation message can include an entity ID and an ID for each TCI state/TCI state ID being activated within that entity as illustrated in FIG. 21. In one example, the activated TCI states of an entity belong to the same TCIStatePoolIndex.

FIG. 21 illustrates another example of MAC CE with TCI state 2100 according to embodiments of the present disclosure. An embodiment of the MAC CE with TCI state 2100 shown in FIG. 21 is for illustration only.

For example, an entity can be a cell (e.g., a physical cell identifier—PCI), the network configures a first TCIStatePoolIndex and a second TCIStatePoolIndex, the activated TCI states of a first PCI (e.g., a serving cell PCI) are activated for (or associated with) the first TCIStatePoolIndex, while the activated TCI states of a second PCI (e.g., a neighboring cell PCI) are activated for (or associated with) the second TCIStatePoolIndex. In another example, an entity can be a TRP, the network configures a first TCIStatePoolIndex and a second TCIStatePoolIndex, the activated TCI states of a first TRP are activated for (or associated with) the first TCIStatePoolIndex, while the activated TCI states of a second TRP are activated for (or associated with) the second TCIStatePoolIndex.

In another example, the activated TCI states/TCI state IDs can be expressed as a bitmap with one bit for each TCI state/TCI state ID configured for that entity. A value of 1 in a bit is used to activate the corresponding TCI state ID In another example 2.2.2, MAC CE activates TCI states/TCI state IDs belonging to different entities. In one example, the activated TCI states of an entity belong to the same TCIStatePoolIndex.

In one example 2.2.2.1, each activated TCI state/TCI state ID includes an entity ID and a TCI state ID within the entity. This is illustrated by way of example in FIG. 21.

In another example 2.2.2.2, the activated TCI states/TCI state IDs can be expressed as a bitmap with one bit for each configured entity with its associated TCI state/TCI state ID. Wherein, the TCI state IDs configured are arranged within the bitmap first in order within each entity and then in order across entities. A value of 1 in a bit is used to activate the corresponding TCI state ID.

In another example 2.2.2.3, the MAC CE activation message includes one or more entity IDs, each entity ID includes one or more TCI states/TCI state IDs for that entity. This illustrated by way of examples in FIG. 22.

FIG. 22 illustrates an example of TCI state ID 2200 according to embodiments of the present disclosure. An embodiment of the TCI state ID 2200 shown in FIG. 22 is for illustration only.

In one example, associated with each entity ID is the number of TCI states/TCI state IDs being activated. The number of activated TCI states/TCI state IDs for each entity can be different. This is illustrated by the top and middle figures of FIG. 22, with the number of TCIs for each entity included in the MAC CE.

In another example, the number of activated TCI states/TCI state IDs for each entity is the same. This is illustrated by the top and middle figures of FIG. 22, with the number of TCIs for each entity NOT included in the MAC CE, but the number of TCIs can be included as a separate field common to all entities, or configured by RRC signaling or specified in system specifications.

In one example, the activated TCI states for each entity is provided by a bitmap, with one bit corresponding to each entity configured by RRC. A value of 1 in a bit is used to activate the corresponding TCI state ID. This is illustrated by the lower figure of FIG. 22.

In another example, the activated TCI states for each entity is a list of TCI states being activated. This is illustrated by the top two rows of FIG. 22.

In another example 2.2.3, a first MAC CE activates a subset of entities. A second MAC CE activates TCI states/TCI state IDs within the activated entities. In one example, each entity within the subset of entities is associated with a CORESETPoolIndex. In one example, a CORESETPoolIndex can be associated with one entity only.

In one example, the first MAC CE can activate any of the entities configured by RRC. In another example, the entities configured by RRC are divided into two subsets. A first subset of entities, which includes entities that are always activated and do not need MAC CE activation (for example this can correspond to serving cell(s)), a second subset of entities that can be activated or deactivated by MAC CE (for example this can correspond to non-serving cells).

In one example 2.2.3.1, second MAC CE for each activated TCI state/TCI state ID includes an entity ID and a TCI state ID within the entity ID. The entity ID can be one of: (1) the entity ID configured by RRC signaling or (2) the order of the entity ID activated by RRC signaling (always activated entities—if applicable), and MAC CE signaling.

In another example 2.2.3.2, the second MAC CE for the activated TCI states/TCI state IDs can be expressed as a bitmap with one bit for each configured TCI state/TCI state ID of the activated entities. Wherein, the TCI state IDs configured are arranged within the bitmap first in order within each entity and then in order across the activated entities. A value of 1 in a bit is used to activate the corresponding TCI state ID.

In another example 2.2.3.3, the second MAC CE includes one or more entity IDs corresponding to the activated MAC CE entities, each entity ID includes one or more TCI states/TCI state IDs for that entity. The entity ID can be one of: (1) the entity ID configured by RRC signaling or (2) the order of the entity ID activated by RRC signaling (always activated entities—if applicable), and MAC CE signaling.

Furthermore, in one example, associated with each MAC CE entity ID is the number of TCI states/TCI state IDs being activated. The number of activated TCI states/TCI state IDs for each entity can be different.

In another example, the number of activated TCI states/TCI state IDs for each entity is the same. The number of TCIs can be included as a separate field common to all entities in the second MAC CE or in the first MAC CE, or configured by RRC signaling or specified in system specification.

Furthermore, in one example, the activated TCI states for each entity is provided by a bitmap, with a bitmap corresponding to the configured TCI states/TCI state IDs of each activated MAC CE. A value of 1 in a bit is used to activate the corresponding TCI state ID.

In another example, the activated TCI states for each entity is a list of TCI states being activated.

FIG. 23 illustrates another example of TCI state ID 2300 according to embodiments of the present disclosure. An embodiment of the TCI state ID 2300 shown in FIG. 23 is for illustration only.

In one example 2.3.1, the activated entities (e.g., entities with activated TCI state IDs) are arranged in order to determine mapping between TCI state ID codepoints and activated TCI state IDs. The TCI state IDs activated are arranged first in order within each activated entity and then in order across activated entities as illustrated in FIG. 23. For $TCI_{k\_m}$, i.e., activated TCI state ID m for activated entity k, the TCI state ID in channel conveying beam indication can be obtained as: TCI State ID=$\sum_{i=0}^{k-1} M_i + m$, wherein, $M_i$ is the number of TCI state IDs activated for entity i.

In another example, if $M_0=M_1= \ldots =M_{K-1}=M$, for $TCI_{k\_m}$, i.e., activated TCI state ID m for activated entity k, the TCI state ID in channel conveying beam indication can be obtained as: TCI State ID=k×M+m.

In yet another example, $M_{max}=\max(M_0, M_1, \ldots, M_{K-1})$, for $TCI_{k\_m}$, i.e., activated TCI state ID m for activated entity k, the TCI state ID in channel conveying beam indication can be obtained as: TCI State ID=k×$M_{max}$+m.

In another example 2.3.2, MAC CE activation provides mapping to TCI state ID codepoints of the channel for conveying the TCI state ID. In example 2.3.2, the mapping can be based on the order of the TCI state activation within the MAC CE message. In this example, the TCI state ID codepoint provides implicitly the entity ID.

FIG. 24 illustrates an example of TCI state ID with two fields 2400 according to embodiments of the present disclosure. An embodiment of the TCI state ID with two fields 2400 shown in FIG. 24 is for illustration only.

In another example 2.3.3, the TCI state ID includes two fields as illustrated in FIG. 24.

A first field that includes an ID of an entity whose TCI state is being indicated. The size of this field is $\lceil \log_2 K \rceil$ bits. Wherein, K is the number of activated entities.

A second field that includes an ID of the TCI state for the entity. The size of this field is $\lceil \log_2 \max(M_0, M_1, \ldots, M_{K-1}) \rceil$ bits. In one further example, if $M_0=M_1= \ldots =M_{K-1}=M$, the size of this field is $\lceil \log_2 M \rceil$ bits. Wherein, $M_i$ is the number of activated TCI states/TCI state IDs for entity i. M is the number of activated TCI states/TCI state IDs for any entity, if the same across entities.

In another example 2.3.4, the channel conveying the TCI state ID indicates more than one TCI state/TCI state IDs, wherein the TCI state/TCI state IDs can correspond to DL TCI state(s) and/or UL TCI state(s) and/or joint DL/UL TCI state(s) and/or separate DL/UL TCI states.

In one example 2.3.4.1, the channel conveying the TCI state ID, indicates TCI state IDs for a same entity.

In one example 2.3.4.1.1, the channel conveying the TCI state ID includes a field for activated entity ID, wherein the size of this field is $\lceil \log_2 K \rceil$ bits, wherein, K is the number of activated entities. Furthermore, the channel conveying the TCI state ID includes one or more fields for the ID of the TCI state within the entity, wherein the size of each field is $\lceil \log_2 \max(M_0, M_1, \ldots, M_{K-1}) \rceil$ bits. In one further example, if $M_0=M_1= \ldots =M_{K-1}=M$, the size of this field is $\lceil \log_2 M \rceil$ bits. Wherein, $M_i$ is the number of activated TCI states/TCI state IDs for entity i. M is the number of activated TCI states/TCI state IDs for any entity of the same across entities.

In another example 2.3.4.1.2, the channel conveying the TCI state ID includes a field for activated entity ID. Furthermore, the channel conveying the TCI state ID includes a bitmap for the activated TCI state IDs for the entity, with a bit corresponding to each activated TCI state ID. A value of 1 in a bit is used to indicate the corresponding TCI state ID. The length of the bitmap field can be $\max(M_0, M_1, \ldots M_{K-1})$, M, if $M_0=M_1= \ldots =M_{K-1}=M$. Unused bits in the bitmap can be reserved. The reserved bits can be the most significant bits or the least significant bits.

In another example 2.3.4.2, the channel conveying the TCI state ID, indicates TCI state IDs for different entities.

In one example 2.3.4.2.1, each indicated TCI state/TCI state ID includes an entity ID and a TCI state ID within the entity ID.

In another example 2.3.4.2.2, the indicated TCI states/TCI state IDs can be expressed as a bitmap with one bit for each activated entity ID with its associated TCI state/TCI state ID. Wherein, the TCI state IDs activated are arranged within the bitmap first in order within each entity and then in order across activated entities. A value of 1 in a bit is used to indicate the corresponding TCI state ID.

In another example 2.3.4.2.3, the indicated TCI states/TCI state IDs can be expressed as one or more entities followed by a bitmap for each entity. Wherein, for each bitmap one bit is associated with the activated TCI state ID of the corresponding entity. A value of 1 in a bit is used to indicate the corresponding TCI state ID.

In another example 2.3.4.2.4, the indicated TCI states/TCI state IDs can be expressed as one or more entities followed by a list of indicated TCI state IDs for each entity. The number of TCI state IDs indicated for each entity can be included in the channel conveying the TCI state ID. In another example, a same number of TCI state IDs can be indicated for each entity, wherein the number of indicated TCI state IDs can be included in the channel conveying the TCI state ID, configured or updated by MAC CE signaling and/or RRC signaling and/or specified in system specifications.

In another example 2.3.4.2.5, the indicated TCI states/TCI state IDs can be expressed as a bit map of entities, wherein a value of 1 in a bit is used to indicate the corresponding entity, followed by a bitmap for each entity. Wherein, for each bitmap one bit is associated with the configured TCI state ID of the corresponding entity. A value of 1 in a bit is used to indicate the corresponding TCI state ID.

In example 2.4, the source reference signals of a TCI state are one of two types below.

In one example of one type, a first source reference signal type, where the resource signal is configured for each entity.

For example, the entity can be a cell with PCI and the source reference signal is the SSB. For example, a first cell is configured with $N_0$ SSBs, and a second cell is configured with $N_1$, etc. In one example, $N_0=N_2=N$. N is the maximum number of reference signals that can be associated with a cell and is specified in the system specification.

In one example, N=8 in FR1. In another example, N=64 in FR2. In one example, a first cell is a serving cell, a second cell is neighboring cell. In another example, there are M−1 neighbor cells, a first cell is serving cell, a second cell is a $1^{st}$ neighboring cell, a third cell is a $2^{nd}$ neighboring cell, . . . , a Mth cell is the (M−1)th neighboring cell. In one example there are M cells that can be serving or neighboring cells. In one example, M is specified in the system specifications. In one example M depends on a UE capability. In one example, M is configured and/or updated by RRC signaling and/or MAC CE signaling and/or L1 control signaling. In one example, the IDs of the M cells (e.g., PCI), or M entities, are configured and/or updated by RRC signaling and/or MAC CE signaling and/or L1 control signaling.

FIG. 25 illustrates an example of Reference Signal ID 2500 according to embodiments of the present disclosure. An embodiment of the Reference Signal ID 2500 shown in FIG. 25 is for illustration only.

FIG. 26 illustrates another example of Entity ID 2600 according to embodiments of the present disclosure. An embodiment of the Entity ID 2600 shown in FIG. 26 is for illustration only.

FIG. 27 illustrates yet another example of Reference Signal ID 2700 according to embodiments of the present disclosure. An embodiment of the Reference Signal ID 2700 shown in FIG. 27 is for illustration only.

In one example 2.4.1, the RS IDs configured are arranged first in order within each entity and then in order across entities as illustrated in FIG. 25. For $RS_{k\_m}$, i.e., RS m configured for entity k, the RS ID can be obtained as: RS ID=$\Sigma_{i=0}^{k-1} M_i + m$, wherein, $M_i$ is the number of RS IDs configured for entity i. k is an entity index or an entity ID. In one example, k can be specified in the system specifications for example, k=0 for a serving entity (e.g., a serving cell) and k=1 for a neighboring entity e.g., a neighboring cell. In another example, k is the order of the entity in the message configuring the M entities as illustrated in FIG. 26, for example, k=0 for the first entity in the message, k=1 for the second entity in the message, . . . k=M−1 for the Mth entity in the message.

In another example, if $M_0=M_1=\ldots=M_{K-1}=M$, for $RS_{k\_m}$, i.e., RS ID m configured for entity k, the RS ID can be obtained as: RS ID=k×M+m.

In yet another example, $M_{max}=\max(M_0, M_1, \ldots M_{K-1})$, for $RS_{k\_m}$, i.e., RS ID m configured for entity k, the RS ID can be obtained as: RS ID=k×$M_{max}$+m.

In another example 2.4.2, the RS ID within the TCI state ID includes two fields as illustrated in FIG. 27, a first field is an entity index or ID k. In one example, k can be specified in the system specifications for example, k=0 for a serving entity (e.g., a serving cell) and k=1 for a neighboring entity e.g., a neighboring cell. In another example, k is the order of the entity in the message configuring the M entities as illustrated in FIG. 26, for example, k=0 for the first entity in the message, k=1 for the second entity in the message, . . . k=M−1 for the Mth entity in the message. A second field is the RS ID configure within the entity.

In one example of one type, a second source reference signal type, wherein the RS IDs are part of a common pool across all entities, wherein the entity, the RS ID is associated with, is determined implicitly based on the RS ID. For example, the source reference signal can be a non-zero power channel state information reference signal (NZP CSI-RS). The configuration of the second source reference signal (e.g., NZP CSI-RS), includes a TCI state ID, wherein the TCI state ID is associated with an entity, through the association of its source reference signal with the entity. The second resource reference signal derives its association with an entity based on the association of the TCI state ID with the entity. This is illustrated by way of example in FIG. 28.

Figure 28:
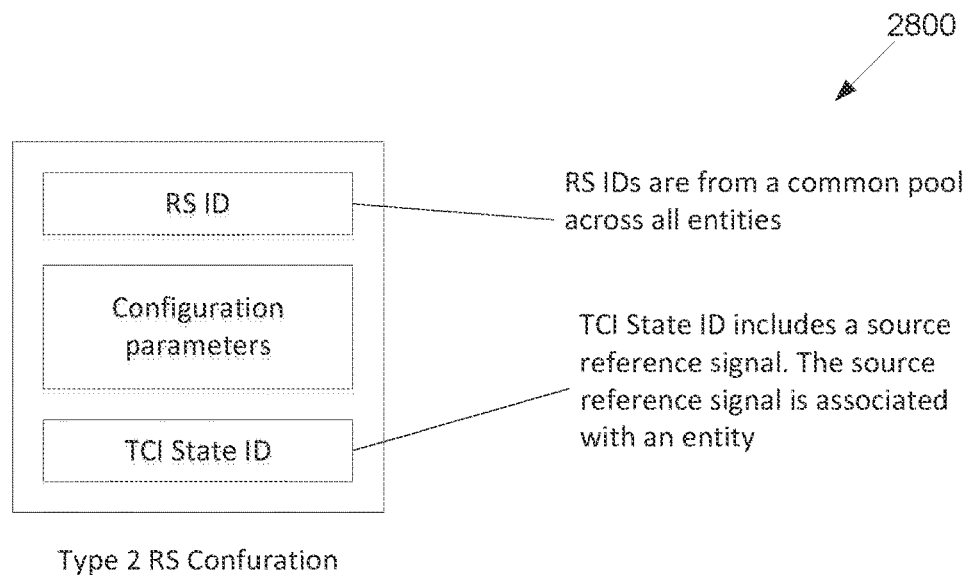
FIG. 28 illustrates an example of source reference signal of the second type in TCI state according to embodiments of the present disclosure.

FIG. 28 illustrates an example of source reference signal of the second type in TCI state 2800 according to embodiments of the present disclosure. An embodiment of the source reference signal of the second type in TCI state 2800 shown in FIG. 28 is for illustration only.

Figure 29:
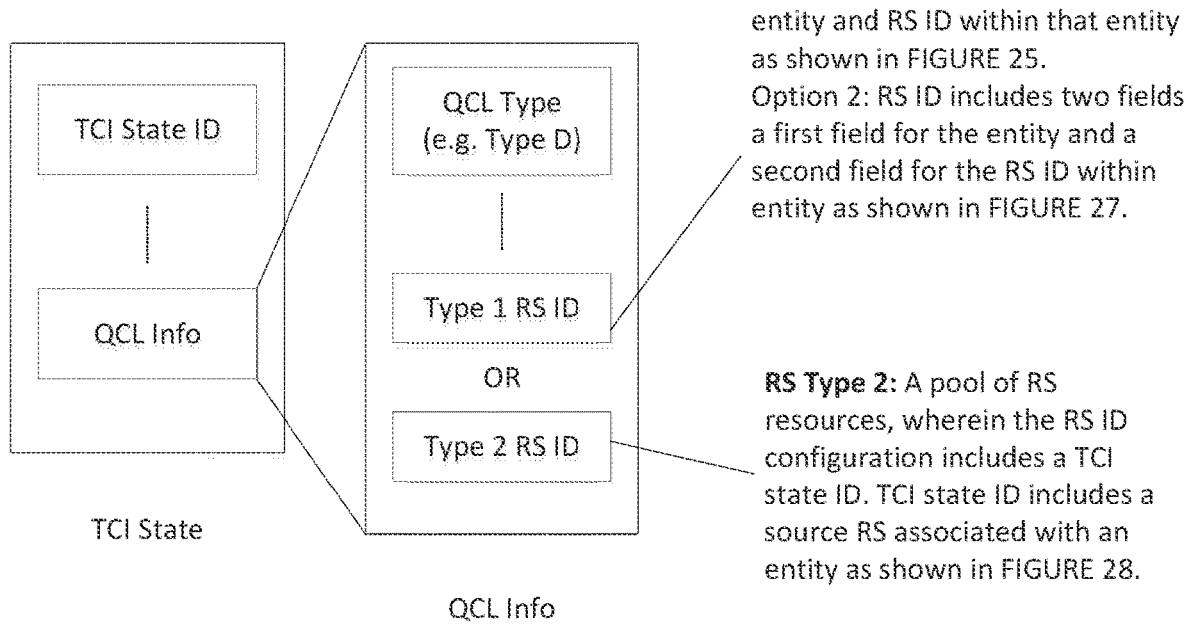
FIG. 29 illustrates an example of TCI state ID with entity according to embodiments of the present disclosure.

FIG. 29 illustrates an example of source reference signals of the first type and the second type in the TCI state. A TCI state includes a TCI state ID and one or more QCL Info information elements (IEs). An embodiment of the source reference signals shown in FIG. 29 is for illustration only.

The QCL Info IE can be QCL Info for a QCL Type, e.g., QCL Type D (Spatial relation QCL Type).

The QCL info includes a source reference signal ID, wherein the source reference signal can be one of Type 1 RS (e.g., SSB) or Type 2 RS (e.g., NZP CSI-RS). The Type 1 RS ID can be determined as a function of the entity index or ID and the RS ID within the entity as described in example 2.4.1 and FIG. 25. Alternatively, the Type 1 RS ID can include two fields, a first field that is an entity ID or index and a second field that is the RS ID configured within the entity as described in example 2.4.2 and FIG. 27. The Type 2 RS ID is from a pool across all entities, where the association of the RS with an entity is derived based on the association of the TCI state ID and its source reference signal with the entity as illustrated in FIG. 28.

In one example, the activated TCI states of an entity (based on the source RS association with an entity) belong to the same TCIStatePoolIndex. For example, an entity can be a cell (e.g., a physical cell identifier—PCI), the network configures a first TCIStatePoolIndex and a second TCIStatePoolIndex, the activated TCI states of a first PCI (e.g., a serving cell PCI) are activated for (or associated with) the first TCIStatePoolIndex, while the activated TCI states of a second PCI (e.g., a neighboring cell PCI) are activated for (or associated with) the second TCIStatePoolIndex. In another example, an entity can be a TRP, the network configures a first TCIStatePoolIndex and a second TCIStatePoolIndex, the activated TCI states of a first TRP are activated for (or associated with) the first TCIStatePoolIndex, while the activated TCI states of a second TRP are activated for (or associated with) the second TCIStatePoolIndex.

In one example 2.5, two TCI states are indicated to a UE (e.g., M=2 and/or N=2) a first TCI state for a first entity (e.g., for a serving cell or a first TRP), and a second TCI state for second entity (e.g., for a cell with a PCI different from the PCI of the serving cell or a second TRP).

In one example 2.5.1, the UE is configured with 2 CORESETPoolIndex values (e.g., CORESETPoolIndex #0 and CORESETPoolIndex #1). The TCI state of the first entity is associated with a first CORESETPoolIndex (e.g., CORESETPoolIndex #0), and the TCI state of the second entity is associated with a second CORESETPoolIndex (e.g., CORESETPoolIndex #1).

In another example 2.5.2, the UE is configured with 2 CORESETs e.g., for UE dedicated channels. The TCI state of the first entity is associated with a first CORESET, and the TCI state of the second entity is associated with a second CORESET.

In another example 2.5.3, the UE is configured with 1 CORESETPoolIndex (or a CORESET for UE dedicated channels). A MAC CE and/or RRC signaling further determines which TCI state (the first TCI state or the second TCI state) to use for CORESET. e.g., a one-bit flag can determine the first TCI state (e.g., logical 0) or the second TCI state (e.g., logical 1) or vice versa. The MAC CE message can be the message activating the TCI states or a separate message.

In a variant of example 2.5.3, a per-determined (e.g., specified in the system specification) TCI state can be used for the CORESETPoolIndex (or CORESET of UE dedicated channels), for example this can be: (1) the first or second the TCI state as specified in the system specifications; (2) the TCI state with the lowest (or highest) ID; and (3) the TCI state with a Type-D source RS or spatial relation having the lowest (or highest) ID.

In a variant of example 2.5.3, a DCI further determines which TCI state (the first TCI state or the second TCI state) to use for the CORESETPoolIndex (CORESET of UE dedicated channels) after a beam application time. e.g., a one-bit flag in the DCI can determine the first TCI state (e.g., logical 0) or the second TCI state (e.g., logical 1) or vice versa. The DCI can be the DCI used for beam indication (e.g., the DCI that carriers the indicated TCI state(s)).

In another example 2.5.4, the UE is configured with a CORESET having two TCI states, e.g., a first TCI state associated with a first entity (e.g., for a serving cell or a first TRP) and a second TCI state associated with a second entity (e.g., for a cell with a PCI different from the PCI of the serving cell or a second TRP). A PDCCH candidate in the CORESET has the PDCCH DMRS associated with the two TCI states in all resource element groups (REGs)/control channel elements (CCEs) of the PDCCH. This can be an example of a single frequency network (SFN).

In one example, the first TCI state is also used to receive a PSDCH from the first entity, and the second TCI state is also used to receive a PDSCH from the second entity. In another example, the two TCI states are used to receive a PDSCH from the two entities, in this case, the PDSCH DMRS is associated with the two TCI states.

In another example 2.5.5, the UE is configured with at least two search space sets (e.g., for UE dedicated channels), a first search space set is associated with a first CORESET and a second search space set is associated with a second CORESET. The first CORESET is associated with a first TCI state associated with a first entity (e.g., for a serving cell or a first TRP). The second CORESET is associated with a second TCI state associated with a second entity (e.g., for a cell with a PCI different from the PCI of the serving cell or a second TRP).

A first PDCCH is transmitted in the first search space set/CORESET. A second PDCCH is transmitted in the second Search Space set/CORESET. The first PDCCH and the second PDCCH are repetitions of one another, i.e., the encoding/rate matching is based on one repetition, and the same coded bits are repeated for the other repetition. Each repetition has the same number of CCEs and the coded bits correspond to the same DCI payload. The first PDCCH and the second PDCCH are linked.

In one example, the first and second PDCCH are time division multiplexed (TDM). Two sets of symbols of the PDCCHes in non-overlapping time intervals are transmitted, wherein each set of symbols is associated with a TCI state of an entity. In one example, the non-overlapping symbols can be in a same slot. In another example, the non-overlapping symbols are in different slots.

In another example, the first and second PDCCH are frequency division multiplexed (FDM). Two sets of REG bundles/CCEs of the PDCCHes in non-overlapping frequencies are transmitted, wherein each set of REG bundles/CCEs is associated with a TCI state of an entity.

In a variant example of example 2.5.5, each PDCCH can have a different payload, for example, the payload of the first PDCCH can include the TCI state of the first entity, while the payload of the second PDCCH can include the TCI state of the second entity. In a further variant, the payload of the first PDCCH can include scheduling information (UL and/or DL) of a first entity, while the payload of the second PDCCH can include scheduling information (UL and/or DL) of a second entity.

In various embodiments of a component 3 of the present disclosure, and in particular, in one example 3.1, the maximum number of activated entities depends on a UE capability.

In another example 3.2, the maximum number of entities that can be activated is configured and/or updated by RRC signaling and/or MAC CE.

In one example 3.2.1, the maximum number of activated entities configured cannot exceed the UE's capability.

In another example 3.2.2, if the maximum number of activated entities configured exceeds the UE's capability, the UE caps the maximum number of entities to a UE capability.

In another example 3.3, there is no limit on the number of entities that can be activated. There is a limit on the number of TCI state IDs that can be activated across all activated entities.

In one example 3.4, the maximum number of activated TCI state IDs is constrained.

In one example 3.4.1, the maximum number of activated TCI state IDs per entity is constrained.

In one example 3.4.1.1, the maximum number of activated TCI state IDs per entity depends on a UE capability.

In one example 3.4.1.2, the maximum number of TCI state IDs per entity that can be activated is configured and/or updated by RRC signaling and/or MAC CE.

In one example 3.4.1.2.1, the maximum number of TCI state IDs per entity configured cannot exceed the UE's capability.

In another example 3.4.1.2.2, if the maximum number of TCI state IDs per entity configured exceeds the UE's capability, the UE caps the maximum number of TCI state IDs per entity to a UE capability.

In another example 3.4.2, the maximum number of activated TCI state IDs across all entities is constrained.

In one example 3.4.2.1, the maximum number of activated TCI state IDs across all entities depends on a UE capability.

In one example 3.4.2.2, the maximum number of TCI state IDs across all entities that can be activated is configured and/or updated by RRC signaling and/or MAC CE.

In one example 3.4.2.2.1, the maximum number of TCI state IDs across entities configured cannot exceed the UE's capability.

In another example 3.4.2.2.2, if the maximum number of TCI state IDs across all entities configured exceeds the UE's capability, the UE caps the maximum number of TCI state IDs across all entities to a UE capability, and the number of TCI states per entity can be scaled proportionately.

FIG. 30 illustrates an example of activated TCI state ID 3000 according to embodiments of the present disclosure.

An embodiment of the activated TCI state ID 3000 shown in FIG. 30 is for illustration only.

In one example 4.1 (top part of FIG. 30), a MAC CE activates a TCI state ID/TCI state code point, and the TCI state ID/TCI state code point is associated with a new entity, i.e., the entity had no prior activated TCI state IDs.

In one example 4.1.1, the time between the MAC CE that activates the TCI state ID/TCI state code point associated with a new entity and the time of sending a channel that conveys the TCI state ID/TCI state code point is $T_{11}$. Wherein, $T_{11}$ can be measured from the start or the end of the PDSCH transmission containing the MAC CE that was positively acknowledged, or from the start or the end of the corresponding acknowledgment.

In one example 4.1.1.1, $T_{11}$ depends on a UE capability.

In another example 4.1.1.2, $T_{11}$ is configured or updated by RRC signaling and/or MAC CE.

In another example 4.1.1.3, $T_{11}$ is determined based on one or more of example 4.1.1.1 and example 4.1.1.2.

In one example 4.1.2, the time between the MAC CE that activates the TCI state ID/TCI state code point associated with a new entity and the time of application of the TCI state ID/TCI state code point to a spatial filter is $T_{12}$. Wherein, $T_{12}$ can be measured from the start or the end of the PDSCH transmission containing the MAC CE that was positively acknowledged, or from the start or the end of the corresponding acknowledgment.

In one example 4.1.2.1, $T_{12}$ depends on a UE capability.

In another example 4.1.2.2, $T_{12}$ is configured or updated by RRC signaling and/or MAC CE.

In another example 4.1.2.3, $T_{12}$ is determined based on one or more of example 4.1.2.1 and example 4.1.2.2.

In one example 4.2 (lower part of FIG. 30), a MAC CE activates a TCI state ID/TCI state code point, and the TCI state ID/TCI state code point is associated with an existing entity, i.e., the entity had prior activated TCI state IDs.

In one example 4.2.1, the time between the MAC CE that activates the TCI state ID/TCI state code point associated with an existing entity and the time of sending a channel that conveys the TCI state ID/TCI state code point is $T_{21}$. Wherein, $T_{21}$ can be measured from the start or the end of the PDSCH transmission containing the MAC CE that was positively acknowledged, or from the start or the end of the corresponding acknowledgment.

In one example 4.2.1.1, $T_{21}$ depends on a UE capability.

In another example 4.2.1.2, $T_{21}$ is configured or updated by RRC signaling and/or MAC CE.

In another example 4.2.1.3, $T_{21}$ is determined based on one or more of example 4.2.1.1 and example 4.2.1.2.

In one example, $T_{21}$ of example 4.2.1 and $T_{11}$ of example 4.1.1 can be the same parameter. In another example, $T_{21}$ of example 4.2.1 and $T_{11}$ of example 4.1.1 can be separate parameters.

In one example 4.2.2, the time between the MAC CE that activates the TCI state ID/TCI state code point associated with an existing entity and the time of application of the TCI state ID/TCI state code point to a spatial filter is $T_{22}$. Wherein, $T_{22}$ can be measured from the start or the end of the PDSCH transmission containing the MAC CE that was positively acknowledged, or from the start or the end of the corresponding acknowledgment.

In one example 4.2.2.1, $T_{22}$ depends on a UE capability.

In another example 4.2.2.2, $T_{22}$ is configured or updated by RRC signaling and/or MAC CE.

In another example 4.2.2.3, $T_{22}$ is determined based on one or more of example 4.2.2.1 and example 4.2.2.2.

In one example, $T_{22}$ of example 4.2.2 and $T_{12}$ of example 4.1.2 can be the same parameter. In another example, $T_{22}$ of example 4.2.2 and $T_{12}$ of example 4.1.2 can be separate parameters.

In one example 4.3, a UE is using a beam corresponding to a first TCI state ID belonging to a first entity. The network signals the UE, through a channel conveying a TCI state ID, a second TCI state ID belonging to a second entity.

FIG. 31 illustrates an example of an indicated TCI state ID/TCI state code point 3100 according to embodiments of the present disclosure. An embodiment of the indicated TCI state ID/TCI state code point 3100 shown in FIG. 31 is for illustration only.

In one example 4.3.1 (e.g., top part of FIG. 31), the first entity and the second entity are the same entity. The time between the channel conveying the TCI State ID/TCI state code point and the time of application of the TCI state ID/TCI state code point to a spatial filter is $T_{31}$. Wherein, $T_{31}$ can be measured from the start or the end of the channel conveying the TCI State ID/TCI state code point, or from the start or the end of the corresponding acknowledgment.

In one example 4.3.1.1, $T_{31}$ depends on a UE capability.

In another example 4.3.1.2, $T_{31}$ is configured or updated by RRC signaling and/or MAC CE.

In another example 4.3.1.3, $T_{31}$ is included in the channel conveying the TCI State ID/TCI state code point.

In another example 4.3.1.4, $T_{31}$ is determined based on one or more of example 4.3.1.1, example 4.3.1.2 and example 4.3.1.3.

In another example 4.3.2 (e.g., lower part of FIG. 31), the first entity and the second entity are different entities. The time between the channel conveying the TCI State ID/TCI state code point and the time of application of the TCI state ID/TCI state code point to a spatial filter is $T_{32}$. Wherein, $T_{32}$ can be measured from the start or the end of the channel conveying the TCI State ID/TCI state code point, or from the start or the end of the corresponding acknowledgment.

In one example 4.3.2.1, $T_{32}$ depends on a UE capability.

In another example 4.3.2.2, $T_{32}$ is configured or updated by RRC signaling and/or MAC CE.

In another example 4.3.2.3, $T_{32}$ is included in the channel conveying the TCI State ID/TCI state code point.

In another example 4.3.2.4, $T_{32}$ is determined based on one or more of example 4.3.2.1, example 4.3.2.2 and example 4.3.2.3.

In one example, $T_{32}$ of example 4.3.2 and $T_{31}$ of example 4.3.1 can be the same parameter. In another example, $T_{32}$ of example 4.3.2 and $T_{31}$ of example 4.3.1 can be separate parameters.

In one example, a TCI state ID (or TCI state code point) includes a single beam or a single TCI state, i.e., a TCI state ID (or TCI state code point) is comprising of only a single beam.

In another example, a TCI state ID (or TCI state code point) includes multiple beams or multiple TCI states, i.e., a TCI state ID (or TCI state code point) is comprising of multiple beams.

In one example 5.1, signaled TCI State IDs, in a same channel that conveys TCI state IDs, belong to the same entity.

In one example 5.1.1, for UE specific channels, a joint TCI state corresponds to a joint beam for DL and UL channels, which is in one entity. A separate TCI state corresponds to separate DL TCI state and UL TCI state, which corresponds to DL and UL beams, respectively, in the same entity.

In another example 5.1.2, a first beam(s) (e.g., TCI state(s)) is used for reception and/or transmission of UE specific channels, and a second beam(s) (e.g., TCI state(s)) is used for reception and/or transmission of common channels, wherein the first beam(s) and the second beam(s) are in the same entity.

In another example 5.1.3, a first beam(s) (e.g., TCI state(s)) is used for reception and/or transmission on a first CC or a first set of CCs, and a second beam(s) (e.g., TCI state(s)) is used for reception and/or transmission on a second CC or a second set of CCs, wherein the first beam(s) and the second beam(s) are in the same entity.

In another example 5.1.4, a first beam(s) (e.g., TCI state(s)) is used for reception and/or transmission of control channels (e.g., PDCCH and/or PUCCH), and a second beam(s) (e.g., TCI state(s)) is used for reception and/or transmission of data channels (e.g., PDSCH and/or PUSCH), wherein the first beam(s) and the second beam(s) are in the same entity.

In another example 5.1.5, a combination of example 5.1.1, example 5.1.2, example 5.1.3 and/or example 5.1.4. For example: (1) DL UE specific control channels of a first CC are received on a first beam; (2) DL UE specific data channels of a first CC are received on a second beam; (3) UL UE specific control channels of a first CC are transmitted on a third beam; (4) UL UE specific data channels of a first CC are transmitted on a fourth beam; (5) DL UE specific channels of a second CC are received on a fifth beam; (6) UL UE specific channels of a second CC are transmitted on a sixth beam; (7) DL common channels of a first CC are received on a seventh beam; and/or (8) DL common channels of a second CC are received on an eighth beam.

In one example 5.2, signaled TCI State IDs, in a same channel that conveys TCI state IDs, can belong to different entities.

In one example 5.2.1, for UE specific channels, a joint TCI state corresponds to a joint beam for DL and UL channels, which is in one entity. A separate TCI state corresponds to separate DL TCI state and UL TCI state, which can correspond to DL and UL beams, respectively, in different entities.

In another example 5.2.2, a first beam(s) (e.g., TCI state(s)) is used for reception and/or transmission of UE specific channels, and a second beam(s) (e.g., TCI state(s)) is used for reception and/or transmission of common channels, wherein the first beam(s) and the second beam(s) can be in different entities.

In another example 5.2.3, a first beam(s) (e.g., TCI state(s)) is used for reception and/or transmission on a first CC or a first set of CCs, and a second beam(s) (e.g., TCI state(s)) is used for reception and/or transmission on a second CC or a second set of CCs, wherein the first beam(s) and the second beam(s) can be in different entities.

In another example 5.2.3a, a first beam(s) (e.g., TCI state(s)) is used for reception and/or transmission of control channels (e.g., PDCCH and/or PUCCH), and a second beam(s) (e.g., TCI state(s)) is used for reception and/or transmission of data channels (e.g., PDSCH and/or PUSCH), wherein the first beam(s) and the second beam(s) can be in different entities.

In another example 5.2.4, a combination of example 5.2.1, example 5.2.2, example 5.2.3 and/or example 5.2.3a. For example: (1) DL UE specific channels of a first CC are received on a beam of a first entity; (2) UL UE specific channels of a first CC are transmitted on a beam of a second entity; (3) DL UE specific channels of a second CC are received on a beam of a third entity; (4) UL UE specific channels of a second CC are transmitted on a beam of a fourth entity; (5) DL common channels of a first CC are received on a beam of a fifth entity; and/or (6) DL common channels of a second CC are received on a beam of a sixth entity.

In another example: (1) DL UE specific control channels are received on a beam of a first entity; and/or (2) DL UE specific data channels and UL UE specific channels are received/transmitted on a beam of second entity.

In another example 5.2.5, the ability of a UE to receive and/or transmit beams on separate entities can be UE capability.

In one example 5.2.5.1, the number of entities the UE can transmit and/or receive beams to and/or from can be defined by a UE capability.

In one example 5.3, a UE is configured, by RRC signaling and/or MAC CE signaling and/or L1 control signaling, to be indicated a separate TCI state for DL channels and UL channels. The UE is further configured to be indicated the DL and UL TCI states in a same channel that conveys a TCI state ID (TCI state code point). For example: (1) a DL related DCI format, i.e., DCI Format 1_0 or DCI Format 1_1 or DCI Format 1_2, with or without a DL assignment; (2) an UL related DCI format, i.e., DCI Format 0_0 or DCI Format 0_1 or DCI Format 0_2, with or without an UL grant; (3) a purposed designed channel for conveying a TCI state (i.e., beam indication); and/or (4) a MAC CE for conveying a TCI state (i.e., beam indication).

The DL TCI state is associated with a cell with a first PCI.

The UL TCI state is associated with a cell with a second PCI.

In one example 5.3.1, the first and the second PCIs are identical (i.e., the same).

In one example 5.3.1.1, the identical first and second PCIs are the PCI of a serving cell.

In another example 5.3.1.2, the identical first and second PCIs are the PCI of a non-serving cell, i.e., a cell with a PCI different from the PCI of the serving cell.

In one example 5.3.2, the first and the second PCIs are different.

In one example 5.3.2.1, the first PCI is the PCI of a serving cell, and the second PCI is the PCI of a non-serving cell, i.e., a cell with a PCI different from the PCI of the serving cell.

In one example 5.3.2.2, the first PCI is the PCI of a non-serving cell, i.e., a cell with a PCI different from the PCI of the serving cell, and the second PCI is the PCI of a serving cell.

In one example 5.3.2.3, the first PCI is the PCI of a first non-serving cell, i.e., a cell with a PCI different from the PCI of the serving cell, and the second PCI is the PCI of a second non-serving cell, i.e., a cell with a PCI different from the PCI of the serving cell and the PCI of the first non-serving cell.

In one example 5.3.3, a UE capability can determine whether a UE can support DL and UL TCI states associated with cells that have different PCIs.

In one example 5.3.4, a UE capability can determine whether a UE can support DL and UL TCI states associated with non-serving cells that have different PCIs.

In one example 5.4, a UE is configured, by RRC signaling and/or MAC CE signaling and/or L1 control signaling, to be indicated a separate TCI state for DL channels and UL channels. The UE is further configured with M DL TCI states (e.g., M=2, with m=0 and m−1) and/or N UL TCI states (e.g., N=2, with n=0 and n=1). The UE is further configured to be indicated the M DL TCI states and/or N UL TCI states in a same channel that conveys a TCI state ID (TCI state code point)

For example: (1) a DL related DCI format, i.e., DCI Format 1_0 or DCI Format 1_1 or DCI Format 1_2, with or without a DL assignment; (2) an UL related DCI format, i.e., DCI Format 0_0 or DCI Format 0_1 or DCI Format 0_2, with or without an UL grant; (3) a purposed designed channel for conveying a TCI state (i.e., beam indication); and/or (4) a MAC CE for conveying a TCI state (i.e., beam indication).

In one example 5.4.1, M=2, DL TCI state for m=0 is associated with a first PCI, DL TCI state for m=1 is associated with a second PCI.

In one example 5.4.1.1, the first and the second PCIs are identical (i.e., the same).

In one example 5.4.1.1.1, the identical first and second PCIs are the PCI of a serving cell.

In another example 5.4.1.1.2, the identical first and second PCIs are the PCI of a non-serving cell, i.e., a cell with a PCI different from the PCI of the serving cell.

In one example 5.4.1.2, the first and the second PCIs are different.

In one example 5.4.1.2.1, the first PCI is the PCI of a serving cell, and the second PCI is the PCI of a non-serving cell, i.e., a cell with a PCI different from the PCI of the serving cell.

In one example 5.4.1.2.2, the first PCI is the PCI of a non-serving cell, i.e., a cell with a PCI different from the PCI of the serving cell, and the second PCI is the PCI of a serving cell.

In one example 5.4.1.2.3, the first PCI is the PCI of a first non-serving cell, i.e., a cell with a PCI different from the PCI of the serving cell, and the second PCI is the PCI of a second non-serving cell, i.e., a cell with a PCI different from the PCI of the serving cell and the PCI of the first non-serving cell.

In one example 5.4.1.3, a UE capability can determine whether a UE can support M DL TCI states associated with cells that have different PCIs.

In one example 5.4.1.4, a UE capability can determine whether a UE can support M DL TCI states associated with non-serving cells that have different PCIs.

In one example 5.4.2, N=2, UL TCI state for n=0 is associated with a first PCI, UL TCI state for n=1 is associated with a second PCI.

In one example 5.4.2.1, the first and the second PCIs are identical (i.e., the same).

In one example 5.4.2.1.1, the identical first and second PCIs are the PCI of a serving cell.

In another example 5.4.2.1.2, the identical first and second PCIs are the PCI of a non-serving cell, i.e., a cell with a PCI different from the PCI of the serving cell.

In one example 5.4.2.2, the first and the second PCIs are different.

In one example 5.4.2.2.1, the first PCI is the PCI of a serving cell, and the second PCI is the PCI of a non-serving cell, i.e., a cell with a PCI different from the PCI of the serving cell.

In one example 5.4.2.2.2, the first PCI is the PCI of a non-serving cell, i.e., a cell with a PCI different from the PCI of the serving cell, and the second PCI is the PCI of a serving cell.

In one example 5.4.2.2.3, the first PCI is the PCI of a first non-serving cell, i.e., a cell with a PCI different from the PCI of the serving cell, and the second PCI is the PCI of a second non-serving cell, i.e., a cell with a PCI different from the PCI of the serving cell and the PCI of the first non-serving cell.

In one example 5.4.2.3, a UE capability can determine whether a UE can support N UL TCI states associated with cells that have different PCIs.

In one example 5.4.2.4, a UE capability can determine whether a UE can support N DL TCI states associated with non-serving cells that have different PCIs.

In one example 5.4.3: (1) M=2, DL TCI state for m=0 is associated with a first PCI, DL TCI state for m=1 is associated with a second PCI; and (2) N=2, UL TCI state for n=0 is associated with a third PCI, UL TCI state for n=1 is associated with a fourth PCI.

In one example 5.4.3.1, the first, the second, the third and the fourth PCIs are identical (i.e., the same).

In one example 5.4.3.1.1, the identical first, second, third and fourth PCIs are the PCI of a serving cell.

In another example 5.4.3.1.2, the identical first, second, third and fourth PCIs are the PCI of a non-serving cell, i.e., a cell with a PCI different from the PCI of the serving cell.

In one example 5.4.3.2, the first and third PCIs are the same, and the second and the fourth PCIs are the same, but the first and the second PCIs are different.

In one example 5.4.3.2.1, the first PCI is the PCI of a serving cell, and the second PCI is the PCI of a non-serving cell, i.e., a cell with a PCI different from the PCI of the serving cell.

In one example 5.4.3.2.2, the first PCI is the PCI of a non-serving cell, i.e., a cell with a PCI different from the PCI of the serving cell, and the second PCI is the PCI of a serving cell.

In one example 5.4.3.2.3, the first PCI is the PCI of a first non-serving cell, i.e., a cell with a PCI different from the PCI of the serving cell, and the second PCI is the PCI of a second non-serving cell, i.e., a cell with a PCI different from the PCI of the serving cell and different from the PCI of first non-serving cell.

In one example 5.4.3.3, the first, second, third and fourth PCIs are all different.

In one example 5.4.3.3.1, at least one of the four PCIs is that of the serving cell.

In one example 5.4.3.3.2, the PCIs are those of a non-serving cells, i.e., cells with PCI different from the PCI of the serving cell.

In one example 5.4.3.3.3, a UE capability limits the number of cells associated with the M+N DL/UL TCI states.

In one example 5.4.3.3.4, a UE capability limits the number of non-serving cells associated with the M+N DL/UL TCI states.

In one example 5.4.3.4, a UE capability can determine whether a UE can support M+N DL/UL TCI states associated with cells that have different PCIs.

In one example 5.4.3.5, a UE capability can determine whether a UE can support M+N DL/UL TCI states associated with non-serving cells that have different PCIs.

In one example 5.5, a UE is configured, by RRC signaling and/or MAC CE signaling and/or L1 control signaling, to be indicated a separate TCI state for DL channels and UL channels. The UE is further configured with M DL TCI states (e.g., M=2, with m=0 and m−1) and/or N UL TCI states (e.g., N=2, with n=0 and n=1). The UE is further configured to be indicated the DL and UL TCI states in a same channel that conveys a TCI state ID (TCI state code point).

For example, a DL related DCI format, i.e., DCI Format 1_0 or DCI Format 1_1 or DCI Format 1_2, with or without a DL assignment: (2) an UL related DCI format, i.e., DCI Format 0_0 or DCI Format 0_1 or DCI Format 0_2, with or without an UL grant; (3) a purposed designed channel for conveying a TCI state (i.e., beam indication); and/or (4) a MAC CE for conveying a TCI state (i.e., beam indication).

The DL TCI state is associated with a first index for "m" (e.g., m=0, or m=1, . . . ).

The UL TCI state is associated with a second index for "n" (e.g., n=0 or n=1, . . . ).

In one example 5.5.1, the first and the second indices are identical (i.e., the same).

In one example 5.5.2, the first and the second indices are different.

In one example 5.5.3, a UE capability can determine whether a UE can support DL and UL TCI states associated with different indices.

In example 5.5, the index form and n can correspond to: (1) cells, wherein one cell can be associated with one or more physical cell IDs (PCIs); (2) PCIs; (3) TRPs; (4) TRP panels; (5) component carriers; (6) SSBs; (7) UE panels; (8) BWPs; (9) frequency spans (e.g., PRBs or sub-carriers); (10) time intervals (e.g., slots or symbols); and/or (11) antenna ports.

A UE can be configured to transmit and/or receive on multiple entities. For example, the multiple entities can correspond to multiple bandwidth parts (BWPs) and/or multiple component carriers (CCs).

In one example 6.1, the UE is configured by RRC configuration a list of entities, e.g., a list of BWP/CC. Let the list of entities be set X. The UE further receives a MAC CE that indicates or activates a subset Y, wherein Y is a subset of X. Subset Y is indicated a common TCI state ID (or TCI state code point), wherein the common TCI state ID (or TCI state code point) applies to all entities (e.g., BWP/CC) of Y.

In one sub-example 6.1.1, the MAC CE that indicates or activates subset Y further includes a reference entity (e.g., BWP/CC), R, that includes the TCI state pool. When the UE is indicated a common TCI state ID (or TCI state code point) for subset Y; for entity (e.g., BWP/CC) Z, wherein Z is an element of Y, the UE determines the TCI state from the TCI state pool in R. In one example R is an element of Y. In another example R is not an element of Y but is an element of X. In yet a third example R is not an element of X. In one example, the TCI state pool is configured in the PDSCH config associated with R.

In one sub-example 6.1.2, a MAC CE separate from the MAC CE that indicates or activates subset Y, includes a reference entity (e.g., BWP/CC), R, that includes the TCI state pool. When the UE is indicated a common TCI state ID (or TCI state code point) for subset Y; for entity (e.g., BWP/CC) Z, wherein Z is an element of Y, the UE determines the TCI state from the TCI state pool in R. In one example R is an element of Y. In another example R is not an element of Y but is an element of X. In yet a third example R is not an element of X. In one example, the TCI state pool is configured in the PDSCH config associated with R.

In one sub-example 6.1.3, there is no MAC CE indication of a reference entity (e.g., BWP/CC), R, that includes the TCI state pool. Z is an element of Y. The configuration of entity (e.g., BWP/CC) Z includes a pointer to the common TCI state pool (e.g., a pointer to a reference entity (e.g., BWP/CC), R, that includes the TCI state pool). In one example, the PDSCH config associated with Z includes a pointer to a reference entity (e.g., BWP/CC), R, that includes the TCI state pool. When the UE is indicated a common TCI state ID (or TCI state code point) for subset Y; for entity (e.g., BWP/CC) Z, the UE determines the TCI state from the TCI state pool in R. In one example R is an element of Y. In another example R is not an element of Y but is an element of X. In yet a third example R is not an element of X. In one example, the TCI state pool is configured in the PDSCH config associated with R.

In one sub-example 6.1.4, there is no MAC CE indication of a reference entity (e.g., BWP/CC), R, that includes the TCI state pool. There is only one entity (e.g., BWP/CC)—e.g., in subset Y or in set X—that is configured a TCI state pool. This is entity (e.g., BWP/CC) R. In one example, the TCI state pool is configured in the PDSCH config associated with R. When the UE is indicated a common TCI state ID (or TCI state code point) for subset Y, for entity (e.g., BWP/CC) Z, wherein Z is an element of Y, the UE determines the TCI state from the TCI state pool in R.

In one sub-example 6.1.5, RRC configuration configures a reference entity (e.g., BWP/CC), R, that includes the TCI state pool. When the UE is indicated a common TCI state ID (or TCI state code point) for subset Y, for entity (e.g., BWP/CC) Z, wherein Z is an element of Y, the UE determines the TCI state from the TCI state pool in R. In one example R is an element of Y. In another example R is not an element of Y but is an element of X. In yet a third example R is an element of X. In yet a fourth example R is not an element of X. In one example, the TCI state pool is configured in the PDSCH config associated with R.

In one sub-example 6.1.6, when the UE is indicated a TCI state ID (or TCI state code point) for subset Y, for entity (e.g., BWP/CC) Z, wherein Z is an element of Y, the UE determines the TCI state according to one of: (1) if the UE is configured TCI state pool associated with Z (e.g., in a corresponding PDSCH config), the UE uses the TCI state pool associated with Z and/or (2) if the UE is not configured a TCI state pool associated with Z, the UE determines a reference entity (e.g., BWP/CC), R, and a corresponding TCI state pool according to examples 6.1.1, 6.1.2, 6.1.3. 6.1.4 and 6.1.5.

In one sub-example 6.1.7, subset Y is set X, i.e., Y=X and there is no further configuration of Y.

In one sub-example 6.1.8, there is a single reference entity (e.g., BWP/CC) in X, wherein R contains the common TCI state pool. In one example, the TCI state pool is configured in the PDSCH config associated with R. There are or more subsets Y (e.g., Y1, Y2, . . . Yi . . . ) within set X. Wherein each subset Yi is indicated a common TCI state ID (or TCI state code point) from the common TCI state pool in R, wherein the common TCI state ID applies to all entities (e.g., BWP/CC) of Yi. In one example R is an element of X. In another example R is not an element of X.

In one sub-example 6.1.9, for a reference entity (e.g., BWP/CC) R, according to the previous sub-examples of example 6.1, a MAC CE actives a set of TCI state code points from the TCI states of the TCI state pool for further beam indication to the UE, for entities (e.g., BWP/CC) in Y. The TCI state code point indication is in a channel the conveys the TCI state ID (TCI state code point). For example, (1) a DL related DCI format, i.e., DCI Format 1_0 or DCI Format 1_1 or DCI Format 1_2, with or without a DL assignment; (2) an UL related DCI format, i.e., DCI Format 0_0 or DCI Format 0_1 or DCI Format 0_2, with or without an UL grant; (3) a purposed designed channel for conveying a TCI state (i.e., beam indication); and/or (4) a MAC CE for conveying a TCI state (i.e., beam indication).

For example, 6.1.8, a MAC CE actives a set of TCI state code points from the TCI states of the TCI state pool for further beam indication to the UE, for entities (e.g., BWP/CC) in Yi (i.e., each Yi has a MAC CE to activate TCI states). The TCI state code point indication is in a channel the conveys the TCI state ID (TCI state code point). For example: (1) a DL related DCI format, i.e., DCI Format 1_0 or DCI Format 1_1 or DCI Format 1_2, with or without a DL assignment; (2) an UL related DCI format, i.e., DCI Format 0_0 or DCI Format 0_1 or DCI Format 0_2, with or without an UL grant; (3) a purposed designed channel for conveying a TCI state (i.e., beam indication); and/or (4) a MAC CE for conveying a TCI state (i.e., beam indication).

In example 6.1.9, a MAC CE activating TCI states includes code point(s) for TCI state IDs for subsequent beam indication. A TCI state code point can include one or more TCI state IDs. For example, a TCI state code point can include: (1) a joint TCI state ID for DL and UL channels; (2) a DL TCI state ID for DL channels; (3) an UL TCI state ID for UL channels; and/or (4) a DL TCI state ID for DL channels and an UL TCI state for UL channels.

A TCI state ID references a corresponding TCI state.

In example 6.1.9, if a MAC CE activating TCI states includes a single TCI state code point (, the TCI state(s) associated with the code point is applied to the entities (e.g., BWP/CC) of subset Y (or corresponding subset Yi).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
receive configuration information for a list of transmission configuration indication (TCI) states associated with a first entity and one or more second entities, wherein:
the first entity is a serving cell, and
each of the one or more second entities is a neighboring cell or a cell with a physical cell identity (PCI) different from a PCI of the serving cell,
receive TCI state code points activated by a medium access control-control element (MAC CE), wherein the MAC CE activates TCI states belonging to different entities, and
receive downlink (DL) control information (DCI) indicating at least one of the activated TCI state code points; and
a processor operably coupled to the transceiver, the processor configured to:
determine a TCI state to apply to at least one of DL channels and uplink (UL) channels within at least one entity, and
update one or more spatial filters for at least one of the DL channels and the UL channels based on the determined TCI state,
wherein the transceiver is further configured to at least one of receive and transmit the DL channels and the UL channels of the at least one entity, respectively, based on the updated one or more spatial filters,
wherein the TCI state includes a source reference signal, and
wherein the source reference signal is identified by a physical cell identity (PCI) index of a cell other than the serving cell and a corresponding synchronization signal/physical broadcast channel (SS/PBCH) block.

2. The UE of claim 1, wherein a TCI state code point includes one of:
one or more DL TCI states,
one or more UL TCI states, or
a combination of one or more DL TCI states and one or more UL TCI states.

3. The UE of claim 1, wherein:
a TCI state includes a source reference signal, and
the source reference signal is associated, through a quasi colocation (QCL) Type-D or a spatial relation, to a reference signal configured for an entity.

4. The UE of claim 1, wherein:
the DCI indicates first and second TCI state code points,
the first TCI state code point is associated with the first entity, and
the second TCI state code point is associated with one of the one or more second entities.

5. The UE of claim 1, wherein:
the configuration information includes a list of entities that share a common TCI state code point indicated by the DCI,
the indicated common TCI state code point is from the TCI state code points activated by the MAC CE, and
the activated TCI state code points are from a list of TCI states configured in one entity.

6. A base station (BS), comprising:
a transceiver configured to transmit configuration information for a list of transmission configuration indication (TCI) states associated with a first entity and one or more second entities, wherein:
the first entity is a serving cell, and
each of the one or more second entities is a neighboring cell or a cell with a physical cell identity (PCI) different from a PCI of the serving cell; and
a processor operably coupled to the transceiver, the processor configured to determine TCI states to activate or indicate for at least one of downlink (DL) channels and uplink (UL) channels of at least one entity,
wherein the transceiver is further configured to:
transmit activated TCI state code points via a medium access control-control element (MAC CE), wherein the MAC CE activates TCI states belonging to different entities, and
transmit DL control information (DCI) indicating at least one of the activated TCI state code points,
wherein the processor is further configured to:
determine a TCI state to apply to at least one of DL channels and UL channels within the at least one entity, and
update one or more spatial filters for at least one of the DL channels and the UL channels based on the determined TCI state,
wherein the transceiver is further configured to at least one of transmit and receive the DL channels and the UL channels of the at least one entity, respectively, based on the updated one or more spatial filters,
wherein the TCI state includes a source reference signal, and wherein the source reference signal is identified by a physical cell identity (PCI) index of a cell other than the serving cell and a corresponding synchronization signal/physical broadcast channel (SS/PBCH) block.

7. The BS of claim 6, wherein a TCI state code point includes one of:
one or more DL TCI states,
one or more UL TCI states, or
a combination of one or more DL TCI states and one or more UL TCI states.

8. The BS of claim 6, wherein:
a TCI state includes a source reference signal, and
the source reference signal is associated, through a quasi colocation (QCL) Type-D or a spatial relation, to a reference signal configured for an entity.

9. The BS of claim 6, wherein:
the DCI indicates first and second TCI state code points,
the first TCI state code point is associated with the first entity, and
the second TCI state code point is associated with one of the one or more second entities.

10. The BS of claim 6, wherein:
the configuration information includes a list of entities that share a common TCI state code point indicated by the DCI,
the indicated common TCI state code point is from the TCI code points activated by the MAC CE, and
the activated TCI state code points are from a list of TCI states configured in one entity.

11. A method of operating a user equipment (UE), the method comprising:
receiving configuration information for a list of transmission configuration indication (TCI) states with a first entity and one or more second entities, wherein:
the first entity is a serving cell, and
each of the one or more second entities is a neighboring cell or a cell with a physical cell identity (PCI) different from a PCI of the serving cell;
receiving TCI state code points activated by a medium access control-control element (MAC CE), wherein the MAC CE activates TCI states belonging to different entities;
receiving downlink (DL) control information (DCI) indicating at least one of the activated TCI state code points;
determining a TCI state to apply to at least one of DL channels and uplink (UL) channels within at least one entity;
updating one or more spatial filters for at least one of the DL channels and the UL channels based on the determined TCI state; and
at least one of receiving and transmitting the DL channels and the UL channels of the at least one entity, respectively, based on the updated one or more spatial filters,
wherein the TCI state includes a source reference signal, and
wherein the source reference signal is identified by a physical cell identity (PCI) index of a cell other than the serving cell and a corresponding synchronization signal/physical broadcast channel (SS/PBCH) block.

12. The method of claim 11, wherein a TCI state code point includes one of:
one or more DL TCI states,
one or more UL TCI states, or
a combination of one or more DL TCI states and one or more UL TCI states.

13. The method of claim 11, wherein:
a TCI state includes a source reference signal, and
the source reference signal is associated, through a quasi colocation (QCL) Type-D or a spatial relation, to a reference signal configured for an entity.

14. The method of claim 11, wherein:
the DCI indicating first and second TCI state code points,
the first TCI state code point is associated with the first entity, and
the second TCI state code point is associated with one of the one or more second entities.

15. The method of claim 11, wherein:
configuration information including a list of entities that share a common TCI state code point indicated by the DCI,
the indicated common TCI state code point is from the TCI state code points activated by the MAC CE, and
the activated TCI state code points are from a list of TCI states configured in one entity.

* * * * *